US008974635B2

(12) United States Patent
Polat et al.

(10) Patent No.: US 8,974,635 B2
(45) Date of Patent: Mar. 10, 2015

(54) PAPER PRODUCT HAVING UNIQUE PHYSICAL PROPERTIES

(71) Applicant: The Procter & Gamble Company, Cincinnati, OH (US)

(72) Inventors: Osman Polat, Montgomery, OH (US); Jeffrey Glen Sheehan, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 14/197,200

(22) Filed: Mar. 4, 2014

(65) Prior Publication Data

US 2014/0182798 A1 Jul. 3, 2014

Related U.S. Application Data

(63) Continuation of application No. 13/714,581, filed on Dec. 14, 2012, now abandoned, which is a continuation of application No. 13/431,259, filed on Mar. 27, 2012, now Pat. No. 8,512,524, which is a continuation of application No. 12/859,495, filed on Aug. 19, 2010, now Pat. No. 8,211,271.

(51) Int. Cl.
*D21H 27/00* (2006.01)
*B31F 1/07* (2006.01)
(Continued)

(52) U.S. Cl.
CPC .............. *D21H 27/40* (2013.01); *D21H 27/004* (2013.01); *D21H 27/005* (2013.01); *D21H 27/30* (2013.01); *D21H 1/02* (2013.01); *B31F 1/07* (2013.01); *B32B 29/00* (2013.01); *D21H 27/007* (2013.01)
USPC ........................................... 162/112

(58) Field of Classification Search
CPC ..... D21H 27/007; D21H 1/02; D21H 27/004; D21H 27/005; D21H 27/30; D21H 27/002; D21H 27/02; D21H 27/40; B31F 1/07; B32B 29/00
USPC .................. 162/109, 111–113, 117, 123–133, 162/204–207; 428/156, 172, 340, 195.1
See application file for complete search history.

(56) References Cited

U.S. PATENT DOCUMENTS

| 3,301,746 A | 1/1967 | Sanford et al. |
| 3,556,932 A | 1/1971 | Coscia et al. |

(Continued)

FOREIGN PATENT DOCUMENTS

| GB | 2498443 A | * | 7/2013 |
| WO | WO-9821410 A1 | | 5/1998 |

(Continued)

OTHER PUBLICATIONS

Bejan, A., "Constructal Theory of Pattern Formation," *Hydrology and Earth System Sciences*, vol. 11, Jan. 17, 2007, pp. 753-768.

(Continued)

*Primary Examiner* — Jose Fortuna
(74) *Attorney, Agent, or Firm* — Peter D. Meyer

(57) ABSTRACT

A web product is described. The web product has a machine direction and a cross-machine direction orthogonal thereto. The web product has at least one ply having a first plurality of low density regions having a first area in the machine and cross-machine directions and a second plurality of low density regions having a second area in the machine and cross-machine directions. The first and second areas are different. The web product has a Dry Bulk, DB, value greater than 15.5 cc/g and a Wet Burst, WB, value greater than 400g.

10 Claims, 8 Drawing Sheets

(51) Int. Cl.
*D21H 27/40* (2006.01)
*D21H 27/30* (2006.01)
*B32B 29/00* (2006.01)

(56) References Cited

U.S. PATENT DOCUMENTS

| | | |
|---|---|---|
| 3,556,933 A | 1/1971 | Williams et al. |
| 3,573,164 A | 3/1971 | Friedberg et al. |
| 3,700,623 A | 10/1972 | Keim |
| 3,772,076 A | 11/1973 | Keim |
| 3,905,863 A | 9/1975 | Ayers |
| 4,191,609 A | 3/1980 | Trokhan |
| 4,239,065 A | 12/1980 | Trokhan |
| 4,440,597 A | 4/1984 | Wells et al. |
| 4,514,345 A | 4/1985 | Johnson et al. |
| 4,528,239 A | 7/1985 | Trokhan |
| 4,529,480 A | 7/1985 | Trokhan |
| 4,637,859 A | 1/1987 | Trokhan |
| 4,919,756 A | 4/1990 | Sawdai |
| 5,098,522 A | 3/1992 | Smurkoski et al. |
| 5,245,025 A | 9/1993 | Trokhan et al. |
| 5,260,171 A | 11/1993 | Smurkoski et al. |
| 5,275,700 A | 1/1994 | Trokhan |
| 5,328,565 A | 7/1994 | Rasch et al. |
| 5,334,289 A | 8/1994 | Trokhan et al. |
| 5,431,786 A | 7/1995 | Rasch et al. |
| 5,443,691 A | 8/1995 | Phan et al. |
| 5,496,624 A | 3/1996 | Stelljes, Jr. et al. |
| 5,500,277 A | 3/1996 | Trokhan et al. |
| 5,514,523 A | 5/1996 | Trokhan et al. |
| 5,554,467 A | 9/1996 | Trokhan et al. |
| 5,566,724 A | 10/1996 | Trokhan et al. |
| 5,580,423 A | 12/1996 | Ampulski et al. |
| 5,624,790 A | 4/1997 | Trokhan et al. |
| 5,628,876 A | 5/1997 | Ayers et al. |
| 5,679,222 A | 10/1997 | Rasch et al. |
| 5,714,041 A | 2/1998 | Ayers et al. |
| 5,906,710 A | 5/1999 | Trokhan |
| 5,906,711 A | 5/1999 | Barnholtz |
| 5,965,235 A | 10/1999 | McGuire et al. |
| 6,277,241 B1 * | 8/2001 | Merker et al. ............ 162/111 |
| 6,423,397 B1 * | 7/2002 | Roussel ................. 428/156 |
| 7,314,665 B2 * | 1/2008 | Stelljes et al. ............ 428/166 |
| 7,374,639 B2 | 5/2008 | Ampulski et al. |
| 7,399,378 B2 * | 7/2008 | Edwards et al. ........... 162/111 |
| 7,494,564 B2 * | 2/2009 | Basler et al. .............. 162/117 |
| 7,550,059 B2 | 6/2009 | Van Phan et al. |
| 7,741,234 B2 * | 6/2010 | Smith et al. .............. 442/381 |
| 7,799,411 B2 * | 9/2010 | Ostendorf et al. ......... 428/212 |
| 7,960,020 B2 | 6/2011 | Manifold et al. |
| 8,163,130 B2 | 4/2012 | Polat et al. |
| 8,211,271 B2 | 7/2012 | Polat et al. |
| 8,298,376 B2 * | 10/2012 | Polat et al. ............... 162/348 |
| 8,313,617 B2 * | 11/2012 | Polat et al. ............... 162/348 |
| 8,512,524 B2 | 8/2013 | Polat et al. |
| 8,657,997 B2 | 2/2014 | Polat et al. |
| 2004/0231813 A1 * | 11/2004 | Basler et al. ............. 162/123 |
| 2006/0088697 A1 * | 4/2006 | Manifold et al. .......... 428/174 |
| 2006/0113049 A1 * | 6/2006 | Knobloch et al. ......... 162/117 |
| 2006/0130988 A1 * | 6/2006 | Hermans et al. .......... 162/123 |
| 2007/0137813 A1 * | 6/2007 | Nickel et al. ............. 162/109 |
| 2008/0087395 A1 * | 4/2008 | Prodoehl et al. .......... 162/125 |
| 2009/0029106 A1 * | 1/2009 | Mauler et al. ............. 428/141 |
| 2009/0218057 A1 * | 9/2009 | Manifold et al. .......... 162/109 |
| 2010/0239825 A1 | 9/2010 | Sheehan et al. |
| 2012/0034430 A1 | 2/2012 | Nelson et al. |
| 2012/0043036 A1 | 2/2012 | Polat et al. |
| 2012/0043037 A1 | 2/2012 | Polat et al. |
| 2012/0043041 A1 | 2/2012 | Polat et al. |
| 2012/0043042 A1 | 2/2012 | Polat et al. |
| 2012/0180971 A1 * | 7/2012 | Polat et al. ............... 162/358.2 |
| 2012/0273148 A1 * | 11/2012 | Orr et al. ................. 162/204 |
| 2012/0277710 A1 * | 11/2012 | Marinelli et al. .......... 604/374 |
| 2013/0098572 A1 * | 4/2013 | Polat et al. ............... 162/100 |
| 2013/0171421 A1 * | 7/2013 | Weisman et al. .......... 428/171 |
| 2013/0209749 A1 * | 8/2013 | Myangiro et al. .......... 428/174 |
| 2014/0124152 A1 * | 5/2014 | Polat et al. ............... 162/112 |
| 2014/0182798 A1 * | 7/2014 | Polat et al. ............... 162/112 |

FOREIGN PATENT DOCUMENTS

| | | |
|---|---|---|
| WO | WO-9859110 A1 | 12/1998 |
| WO | WO 9963158 A1 * | 12/1999 |
| WO | WO 2005107427 A2 * | 11/2005 |
| WO | WO-2006/132976 A1 | 12/2006 |
| WO | WO-2010/076689 A1 | 8/2010 |

OTHER PUBLICATIONS

PCT International Search Report, mailed Oct. 24, 2011, 4 pages.

* cited by examiner

PAPER PRODUCT HAVING UNIQUE PHYSICAL PROPERTIES

FIELD OF THE INVENTION

The present invention is related to paper products. More particularly, the present invention relates to single and multiple ply paper products having defined physical parameters.

BACKGROUND OF THE INVENTION

Disposable products such as facial tissue, sanitary tissue, paper towels, and the like are typically made from one or more webs of paper. If the products are to perform their intended tasks, the paper webs from which they are formed must exhibit certain physical characteristics. Among the more important of these characteristics are strength, softness, and absorbency. Strength is the ability of a paper web to retain its physical integrity during use. Softness is the pleasing tactile sensation the user perceives as the user crumples the paper in his or her hand and contacts various portions of his or her anatomy with the paper web. Softness generally increases as the paper web stiffness decreases. Absorbency is the characteristic of the paper web which allows it to take up and retain fluids. Typically, the softness and/or absorbency of a paper web increases at the expense of the strength of the paper web. Acco, papermaking methods have been developed in an attempt to provide soft and absorbent paper webs having desirable strength characteristics.

Processes for the manufacture of paper products generally involve the preparation of aqueous slurry of cellulosic fibers and subsequent removal of water from the slurry while contemporaneously rearranging the fibers to form an embryonic web. Various types of machinery can be employed to assist in the dewatering process. A typical manufacturing process employs the aforementioned Fourdrinier wire papermaking machine where a paper slurry is fed onto a surface of a traveling endless wire where the initial dewatering occurs. In a conventional wet press process, the fibers are transferred directly to a capillary de-watering belt where additional de-watering occurs. In a structured web process, the fibrous web is subsequently transferred to a papermaking belt where rearrangement of the fibers is carried out.

A preferred papermaking belt in a structured process has a foraminous woven member surrounded by a hardened photosensitive resin framework. The resin framework can be provided with a plurality of discrete, isolated channels known as deflection conduits. Such a papermaking belt can be termed a deflection member because the papermaking fibers deflected into the conduits become rearranged upon the application of a differential fluid pressure. The utilization of the belt in the papermaking process provides the possibility of creating paper having certain desired characteristics of strength, absorption, and softness. An exemplary papermaking belt is disclosed in U.S. Pat. No. 4,529,480.

Deflection conduits can provide a means for producing a Z-direction fiber orientation by enabling the fibers to deflect along the periphery of the deflection conduits as water is removed from the aqueous slurry of cellulosic fibers. The total fiber deflection is dependent on the size and shape of the deflection conduits relative to the fiber length. Large conduits allow smaller fibers to accumulate in the bottom of the conduit which in turn limits the deflection of subsequent fibers depositing therein. Conversely, small conduits allow large fibers to bridge across the conduit opening with minimal fiber deflection. Deflection conduits defined by a periphery forming sharp corners or small radii increase the potential for fiber bridging which minimizes fiber deflection. Exemplary conduit shapes and their effect on fiber bridging is described in U.S. Pat. No. 5,679,222.

As the cellulosic fibrous web is formed, the fibers are predominantly oriented in the X-Y plane of the web thereby providing negligible Z-direction structural rigidity. In a wet press process, as the fibers oriented in the X-Y plane are compacted by mechanical pressure, the fibers are pressed together increasing the density of the paper web while decreasing the thickness. In contrast, in a structured process, the orientation of fibers in the Z-direction of the web enhances the web's Z-direction structural rigidity and its corresponding resistance to mechanical pressure. Accordingly, maximizing fiber orientation in the Z-direction maximizes caliper.

A paper produced according to a structured web process can be characterized by having two physically distinct regions distributed across its surfaces. One region is a continuous network region which has a relatively high density and high intrinsic strength. The other region is one which is comprised of a plurality of domes which are completely encircled by the network region. The domes in the latter region have relatively low densities and relatively low intrinsic strength compared to the network region.

The domes are produced as fibers fill the deflection conduits of the papermaking belt during the papermaking process. The deflection conduits prevent the fibers deposited therein from being compacted as the paper web is compressed during a drying process. As a result, the domes are thicker having a lower density and intrinsic strength compared to the compacted regions of the web. Consequently, the caliper of the paper web is limited by the intrinsic strength of the domes. An exemplary formed paper is described in U.S. Pat. No. 4,637,859.

After the initial formation of the web, which later becomes the cellulosic fibrous structure, the papermaking machine transports the web to the dry end of the machine. In the dry end of a conventional machine, a press felt compacts the web into a single region of cellulosic fibrous structure having uniform density and basis weight prior to final drying. The final drying can be accomplished by a heated drum, such as a Yankee drying drum, or by a conventional de-watering press. Through air drying can yield significant improvements in consumer products. In a through-air-drying process, the formed web is transferred to an air pervious through-air-drying belt. This "wet transfer" typically occurs at a pick-up shoe, at which point the web may be first molded to the topography of the through air drying belt. In other words, during the drying process, the embryonic web takes on a specific pattern or shape caused by the arrangement and deflection of cellulosic fibers. A through air drying process can yield a structured paper having regions of different densities. This type of paper has been used in commercially successful products, such as Bounty® paper towels and Charmin® bath tissue. Traditional conventional felt drying does not produce a structured paper having these advantages. However, it would be desirable to produce a structured paper using conventional drying at speeds equivalent to, or greater than, a through air dried process.

Once the drying phase of the papermaking process is finished, the arrangement and deflection of fibers is complete. However, depending on the type of the finished product, paper may go through additional processes such as calendering, softener application, and converting. These processes tend to compact the dome regions of the paper and reduce the overall thickness. Thus, producing high caliper finished paper products having two physically distinct regions requires forming cellulosic fibrous structures in the domes having a resistance to mechanical pressure.

It would be advantageous to provide a wet pressed paper web having increased strength and wicking ability. It would be also be advantageous to provide a non-embossed patterned paper web having a relatively high density continuous network, a plurality of relatively low density domes dispersed throughout the continuous network, and a reduced thickness transition region at least partially encircling each of the low density domes.

SUMMARY OF THE INVENTION

The present disclosure relates to a web product having at least one ply and having a Dry Bulk, DB, value greater than 15.5 cc/g and a Wet Burst, WB, value greater than 400 g.

The present disclosure also relates to a web product having at least one ply and having a Dry Bulk, DB, value greater than 15.5 cc/g and a Total Tensile Strength, TT, value greater than 2000 g/25.4 mm.

DETAILED DESCRIPTION OF THE INVENTION

As used herein, the terms "paper web," "web," "paper sheet," "fibrous structure," and "paper product" are all used interchangeably to refer to sheets of paper products suitable for consumer use such as paper toweling, bath tissue, and facial tissue. In one example, the paper products of the present invention are disposable. For example, the fibrous structures of the present invention are non-textile fibrous structures. Web products that are the subject of this invention may be useful as a wiping implement for post-urinary and post-bowel movement cleaning (toilet tissue), for otorhinolaryngological discharges (facial tissue), and multi-functional absorbent and cleaning uses (absorbent towels). Products of the present invention can be flushable, i.e., such as bath tissue. In a preferred embodiment, the paper products may be convolutely wound about a core or without a core to form a rolled paper product. These rolled products may comprise a plurality of connected and perforated sheets that are separably dispensable from adjacent sheets.

Non-limiting examples of processes for making fibrous structures include known wet-laid papermaking processes, air-laid papermaking processes, and wet solution and dry filament spinning processes that are typically referred to as nonwoven processes. Further processing of the fibrous structure may be carried out such that a finished fibrous structure is formed. For example, in typical papermaking processes, the finished fibrous structure is wound on the reel at the end of papermaking. The finished fibrous structure may subsequently be converted into a finished product, e.g. a sanitary paper product. By way of non-limiting example only, a fibrous structure consistent with the present invention can be made by a process comprising the steps of forming an aqueous papermaking furnish, depositing this furnish on a foraminous imprinting member having a foraminous surface, and removing the water from the furnish (e.g., by gravity or vacuum-assisted drainage), forming an embryonic web, transferring the embryonic web from the forming surface to a transfer surface traveling at a lower speed than the forming surface. The web is then transferred to a fabric upon which it is through air dried to a final dryness after which it is wound upon a reel.

Figure 1:
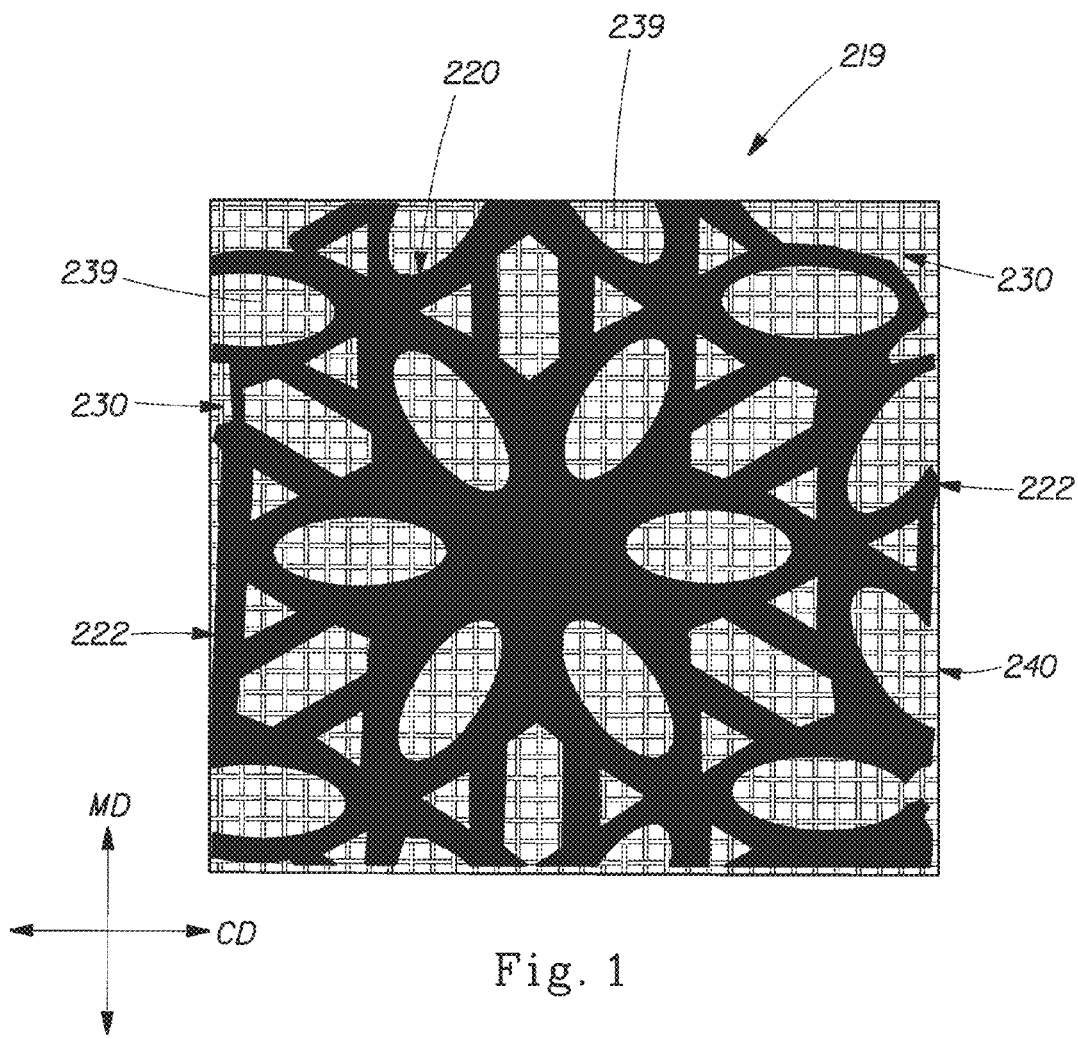
FIG. 1 is a schematic illustration of a plan view of an exemplary foraminous imprinting member formed from a plurality of unit cells having a first web contacting face comprising a macroscopically monoplanar, patterned continuous network web imprinting surface defining within the foraminous imprinting member a plurality of discrete, isolated, non connecting deflection conduits.

As shown in FIG. 1, an exemplary foraminous imprinting member 219 has a first web contacting face 220 and a second felt contacting face 240. The web contacting face 220 has a web imprinting surface 222 and a deflection conduit portion 230. The deflection conduit portion 230 forms at least a portion of a continuous passageway extending from the first face 220 to the second face 240 for carrying water through the foraminous imprinting member 219. Accordingly, when water is removed from the web of papermaking fibers in the direction of the foraminous imprinting member 219, the water can be disposed of without having to again contact the web of papermaking fibers. The foraminous imprinting member 219 can be an endless belt. The first web contacting face 220 of the foraminous imprinting member 219 can be sprayed with an emulsion comprising about 90 percent by weight water, about 8 percent petroleum oil, about 1 percent cetyl alcohol, and about 1 percent of a surfactant such as Adogen TA-100. Such an emulsion can facilitate transfer of the web from the imprinting member 219 to the drying drum. Of course, it will be understood that the foraminous imprinting member 219 need not comprise an endless belt if used in making handsheets in a batch process.

In one embodiment the foraminous imprinting member 219 can comprise a fabric belt formed of woven filaments. The foraminous imprinting member 219 can comprise a woven fabric. As one of skill in the art will recognize, woven fabrics typically comprise warp and weft filaments where warp filaments are parallel to the machine direction and weft filament are parallel to the cross machine direction. The interwoven warp and weft filaments form discontinuous knuckles where the filaments cross over one another in succession. These discontinuous knuckles provide discrete imprinted areas in the molded web during the papermaking process. As used herein the term "long knuckles" is used to define discontinuous knuckles formed as the warp and weft filaments cross over two or more warp or weft filament, respectively. Suitable woven filament fabric belts for use as the foraminous imprinting member 219 are disclosed in U.S. Pat. Nos. 3,301,746; 3,905,863; 4,191,609; and 4,239,065.

The knuckle imprint area of the woven fabric may be enhanced by sanding the surface of the filaments at the warp and weft crossover points. Exemplary sanded woven fabrics are disclosed in U.S. Pat. Nos. 3,573,164 and 3,905,863.

The absolute void volume of a woven fabric can be determined by measuring caliper and weight of a sample of woven fabric of known area. The caliper can measured by placing the sample of woven fabric on a horizontal flat surface and confining it between the flat surface and a load foot having a horizontal loading surface, where the load foot loading surface has a circular surface area of about 3.14 square inches and applies a confining pressure of about 15 g/cm$^2$ (0.21 psi) to the sample. The caliper is the resulting gap between the flat surface and the load foot loading surface. Such measurements can be obtained on a VIR Electronic Thickness Tester Model II available from Thwing-Albert, Philadelphia, Pa.

The density of the filaments can be determined while the density of the void spaces is assumed to be 0 gm/cc. For example, polyester (PET) filaments have a density of 1.38 g/cm$^3$. The sample of known area is weighed, thereby yielding the mass of the test sample.

Figure 3:
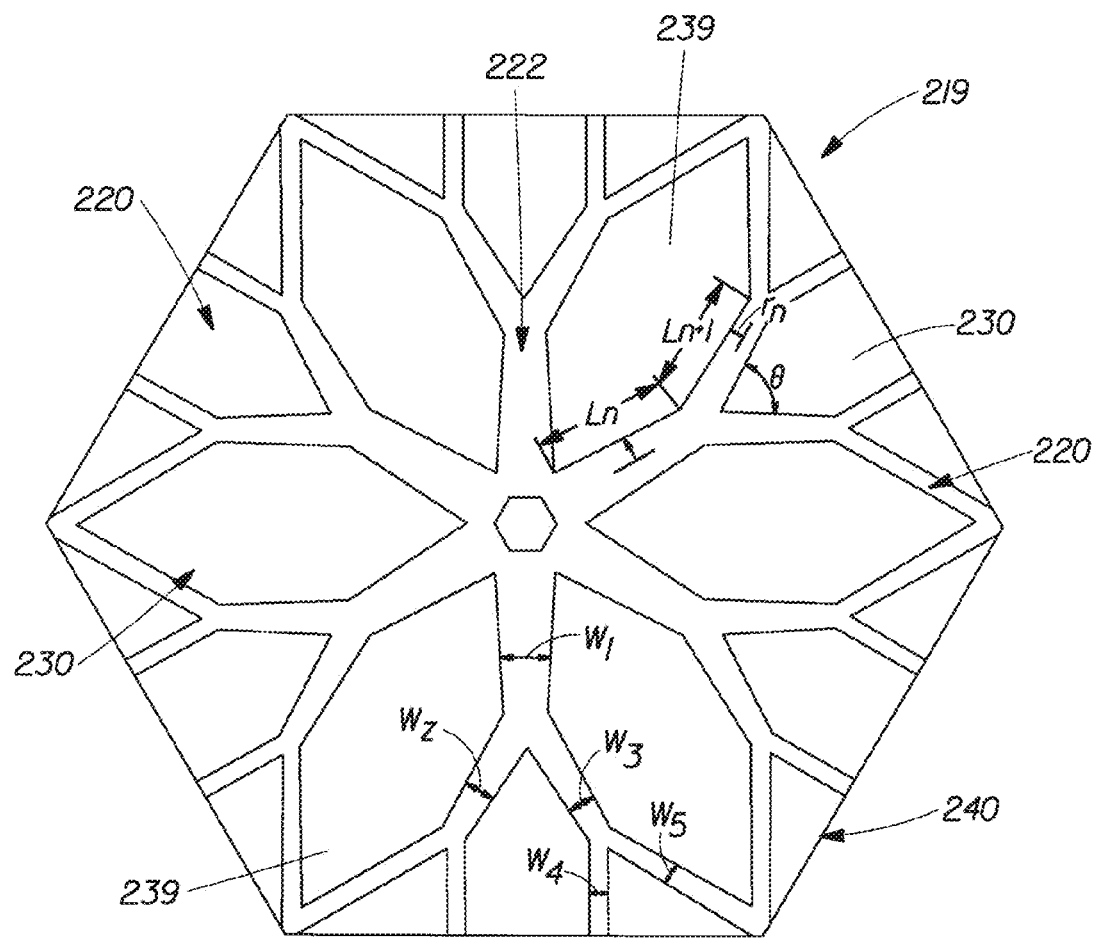
FIG. 3 is a schematic illustration of an exemplary unit cell where the land areas exhibit a geometric pattern that is repeated at ever smaller scales.
Figure 4:
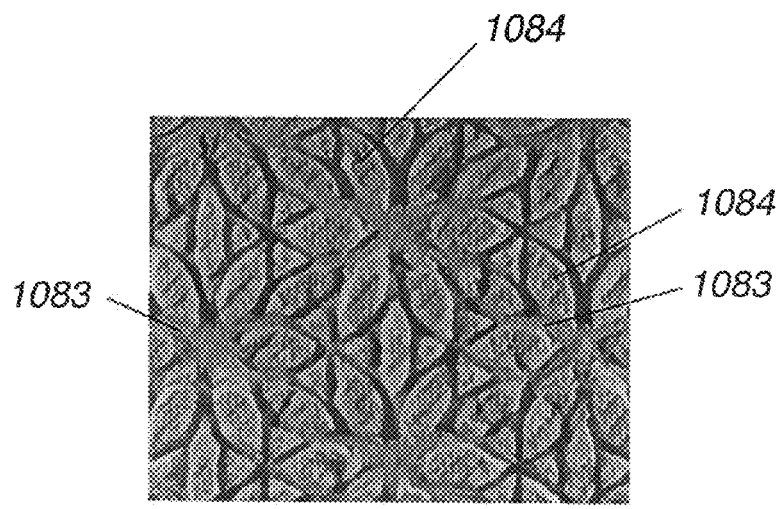
FIG. 4 is a photograph of a molded paper web formed using the foraminous imprinting member of FIGS. 1 and 3 showing a land and a pillow area.
Figure 5:
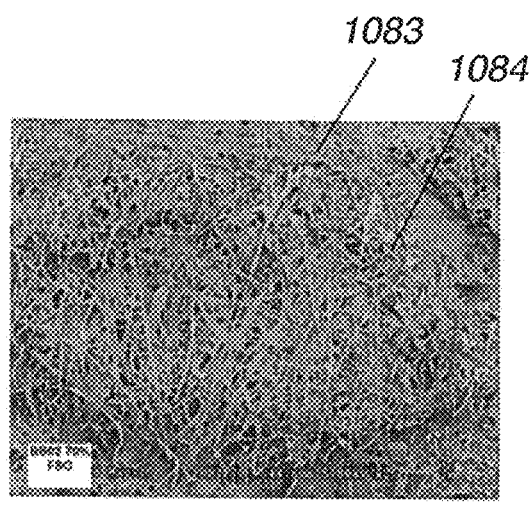
FIG. 5 is a photograph of an exemplary paper web made using the foraminous imprinting member of FIG. 1 showing relatively low density domes which are foreshortened by creping, the domes dispersed throughout a relatively high density, continuous network region.

In another exemplary but non-limiting embodiment, the first web contacting face 220 of the foraminous imprinting member 219 comprises a macroscopically monoplanar, patterned, continuous network web imprinting surface 222. The plane of the foraminous imprinting member 219 defines its MD/CD (X-Y) directions. Perpendicular to the MD/CD directions and the plane of the imprinting fabric is the Z-direction of the imprinting fabric. The continuous network web imprinting surface 222 defines within the foraminous imprinting member 219 a plurality of discrete, isolated, non-connecting deflection conduits 230. The deflection conduits 230 have openings 239 which are preferably of uniform shape and distributed in a repeating, preselected pattern on the first web contacting face 220. Such a continuous network web imprinting surface 222 and discrete deflection conduits 230 are useful for forming a paper structure having a continuous, relatively high density network region 1083 and a plurality of relatively low density domes 1084 dispersed throughout the continuous, relatively high density network region 1083 as shown in FIGS. 3-5.

An exemplary foraminous imprinting member 219 having a continuous network web imprinting surface 222 and discrete isolated deflection conduits 230 suitable for use with the present invention can be manufactured according to the teachings of U.S. Pat. Nos. 4,514,345; 4,528,239; 4,529,480; 5,098,522; 5,260,171; 5,275,700; 5,328,565; 5,334,289; 5,431,786; 5,496,624; 5,500,277; 5,514,523; 5,554,467; 5,566,724; 5,624,790; 5,714,041; and, 5,628,876.

Figure 2:
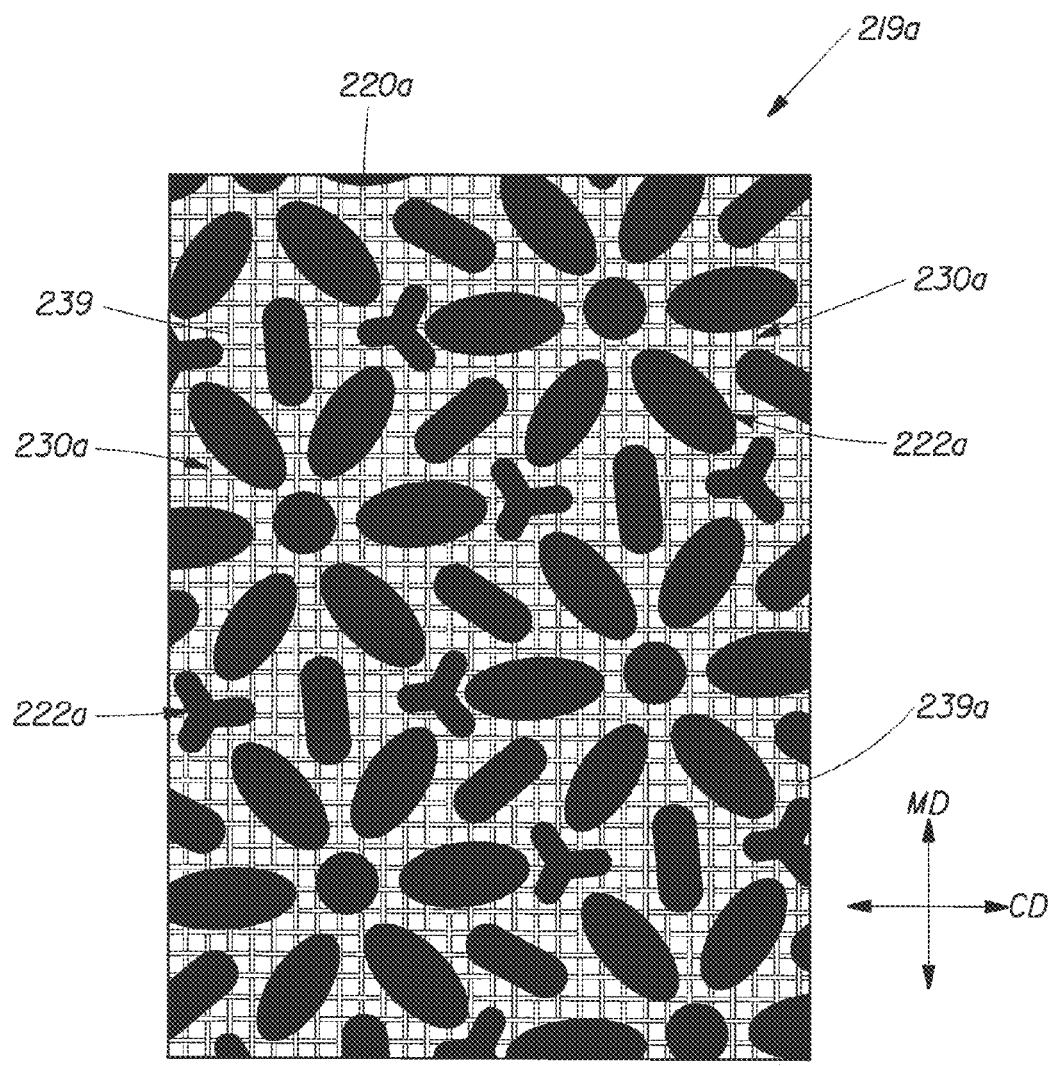
FIG. 2 is a schematic illustration of a plan view of an alternative foraminous imprinting member formed from a plurality of unit cells having a first web contacting face comprising a macroscopically monoplanar, patterned continuous network of deflection conduits defining within the foraminous member a plurality of discrete, isolated web imprinting surfaces.

Alternatively, as shown in FIG. 2, the first web contacting face 220a of the foraminous imprinting member 219a comprises a macroscopically monoplanar, patterned, continuous deflection conduits 230a. The plane of the foraminous imprinting member 219a defines its MD/CD (X-Y) directions. Perpendicular to the MD/CD directions and the plane of the imprinting fabric is the Z-direction of the imprinting fabric. The continuous deflection conduits 230a defines within the foraminous imprinting member 219a a plurality of discrete, isolated, non-connecting web imprinting surfaces 222a. The deflection conduits 230a have a continuous opening 239a which defines the shape of the web imprinting surfaces 222a. The web imprinting surfaces 222a are preferably distributed in a repeating, preselected pattern on the first web contacting face 220a.

Referring again to FIGS. 1 and 3, the continuous network web imprinting surface 222 (and alternatively the continuous deflection conduits 230a of FIG. 2 and the physical and numerical corresponding components thereof) is provided with a geometric shape that can be split into parts, each of which is (at least approximately) a reduced-size copy of the whole. This is known to those of skill in the art as the property of self-similarity. These shapes: 1. Have a fine structure at arbitrarily small scales, 2. Are generally too irregular to be easily described in traditional Euclidean geometric language, 3. Are self-similar (at least approximately or stochastically), 4. Have a Hausdorff dimension that is greater than its topological dimension (although this requirement is not met by space-filling curves such as the Hilbert curve), and 5. Have a simple and recursive definition. The geometric shapes preferably have either exact self-similarity (appears identical at different scales) or quasi-self-similarity (appears approximately identical at different scales).

Examples of geometric shapes suitable for use with the present invention and forming the continuous network web imprinting surface 222 include fractals and constructals. Because they appear similar at all levels of magnification, fractals are often considered to be infinitely complex (in informal terms). Images of fractals suitable for use with the present invention and capable of providing the desired continuous network web imprinting surface 222 can be created using fractal-generating software. Images produced by such software are normally referred to as being fractals even if they do not have the above characteristics, such as when it is possible to zoom into a region of the fractal that does not exhibit any fractal properties. Also, these may include calculation or display artifacts which are not characteristics of true fractals. Exemplary, but non-limiting techniques for generating fractals are: 1. Escape-time fractals (also known as "orbits" fractals and are defined by a formula or recurrence relation at each point in a space, for example Mandelbrot set, Julia set, the Burning Ship fractal, the Nova fractal and the Lyapunov fractal), 2. Iterated function systems (have a fixed geometric replacement rule, for example Cantor set, Sierpinski carpet, Sierpinski gasket, Peano curve, Koch snowflake, Harter-Highway dragon curve, T-Square, Menger sponge), 3. Random fractals (Generated by stochastic rather than deterministic processes, for example, trajectories of the Brownian motion, Lévy flight, fractal landscapes and the Brownian tree), and 4. Strange attractors (Generated by iteration of a map or the solution of a system of initial-value differential equations that exhibit chaos).

An exemplary but non-limiting fractal, the Mandelbrot set, is based on the multiplication of the complex numbers. Start with a complex number $z_0$. From $z_0$ define $z_1=(z_0)^2+z_0$. Assuming that is known, $z_{x+1}$ is defined to be $(z_x)^2+z_x$. The points in the Mandelbrot set are all those points which stay relatively close to the point 0+0i (in the sense that they are always within some fixed distance of (0+0i) as we repeat this process. As it turns out, if $z_x$ is ever outside of the circle of radius 2 about the origin for some n, it won't be in the Mandelbrot set.

In contrast to fractal models of phenomena, constructal law is predictive and thus can be tested experimentally. Constructal theory puts forth the idea that the generation of design (configuration, pattern, geometry) in nature is a physics phenomenon that unites all animate and inanimate systems. For example, in point-area and point-volume flows, constructal theory predicts tree architectures, such flows displaying at least two regimes: one highly resistive and a less resistive one. Constructal theory can be applied at any scale: from macroscopic to microscopic systems. The constructal way of distributing any system's imperfection is to put the more resistive regime at the smallest scale of the system. The constructal law is the principle that generates the perfect form, which is the least imperfect form possible.

In order to mathematize the constructal law new properties for a thermodynamic system were defined that distinguish the thermodynamic system from a static (equilibrium, nothing flows) system, that does not have configuration. The properties of a flow system are:

(1) global external size, e.g., the length scale of the body bathed by the tree flow L;
(2) global internal size, e.g., the total volume of the ducts V;
(3) at least one global measure of performance, e.g., the global flow resistance of the tree R;
(4) configuration, drawing, architecture; and
(5) freedom to morph, i.e., freedom to change the configuration.

The global external and internal sizes (L, V) mean that a flow system has at least two length scales L and $V^{1/3}$. These form a dimensionless ratio—the svelteness $S_v$—which is a new global property of the flow configuration (Lorente and Bejan, 2005).

$$S_v = \frac{\text{external flow length scale}}{\text{internal flow length scale}} = \frac{L}{V^{1/3}}$$

Constructal law is the statement that summarizes the common observation that flow structures that survive are those that morph (evolve) in one direction in time: toward configurations that make it easier for currents to flow. This statement refers strictly to structural changes under finite-size constraints. If the flow structures are free to change), in time they will move at constant L and constant V in the direction of progressively smaller R. Constructal law requires:

$R_2 \leq R_1$ (constant $L, V$)

If freedom to morph persists, then the flow structure will continue toward smaller R values. Any such change is characterized by:

$dR \leq 0$ (constant $L, V$)

The end of this migration is the "equilibrium flow structure", where the geometry of the flow enjoys total freedom. Equilibrium is characterized by minimal R at constant L and V. In the vicinity of the equilibrium flow structure we have:

$dR = 0$ and $d^2R > 0$ (constant $L, V$)

The R(V) curve generated is the edge of the cloud of possible flow architectures with the same global size L. The curve has negative slope because of the physics of flow: the resistance decreases when the flow channels open up:

$$\left(\frac{\partial R}{\partial V}\right)_L < 0$$

The evolution of configurations in the constant-V cut (also at constant L) represents survival through increasing performance—survival of the fittest. The idea of constructal-law is that freedom to morph is good for performance.

The same time arrow can be described alternatively with reference to the constant-R cut through three-dimensional space. Flow architectures with the same global performance (R) and global size (L) evolve toward compactness and svelteness—smaller volumes dedicated to internal ducts, i.e., larger volumes reserved for the working "tissue" (the interstices). The global external and internal sizes (L, V) mean that a flow system has scales L and $V^{1/3}$. These form a dimensionless ratio (svelteness, $S_v$) that is a property of the flow configuration. For a system with fixed global size and global performance to persist in time (to live), it must evolve in such a way that its flow structure occupies a smaller fraction of the available space. This is survival based on the maximization of the use of the available space. Survival by increasing $S_v$ (compactness) is equivalent to survival by increasing performance.

A third equivalent statement of the constructal law becomes evident if the constant-L design is recast in constant-V design space. The contribution of the shape and orientation of the hyper-surface of non-equilibrium flow structures provides for the slope of the curve in the bottom plane $(\partial R / \partial L)_V$ is positive. This is because the flow resistance increases when the distance traveled by the stream increases. The flow structures of a certain performance level (R) and internal flow volume (V) morph into new flow structures that cover progressively larger territories. Again, flow configurations evolve toward greater $S_v$.

The geometries of the continuous network web imprinting surface 222 shown in FIG. 2 provide for a plurality of tessellating unit cells (representatively shown in FIG. 3). Each unit cell is provided with a centroid where each first land area having a width ($W_1$) forming the continuous network web imprinting surface 222 emanates from. Each land area is preferentially at least bifurcates into additional land areas (e.g., second land area, third land area, etc.) each having a width (e.g., $W_2$, $W_3$, etc.) that is different from the width of first land area ($W_1$). Each additional land area (e.g., second land area, third land area, etc.) can then at least bifurcate into yet further additional land areas having widths that are different from those of the additional land areas.

In the example provided in FIG. 3 the design is similar to that of vascular branching. The analytical method described by Rosen (Ch. 3 in Optimality Principles in Biology, Robert Rosen, Butterworths, London, 1967) can be used to determine the widths and lengths of the branches and in the angles between them. Optimizing the radii (r) of the capillary channels and their lengths (L) by considering capillary pressure and Hagen-Poiseuille drag, results in the relationships between $L_n$, $r_n$, $L_{n+1}$, $r_{n+1}$, and θ as shown in FIG. 3.

Since $L_n$, $r_n$, $L_{n+1}$, and $r_{n+1}$ are typically used to describe the relationships in naturally occurring capillary-like systems having 3-dimensions, it should be readily clear to one of skill in the art the land areas of the continuous network regions of the description herein will reference a width (W) because the structures of the instant disclosure are essentially macroscopically mono-planar in the machine and cross-machine directions. It would be understood by one of skill in the art that in such a circumstance that 2r=W. It should also be understood by one of skill in the art that in order to account for design choice (e.g., linear, tapered, curvilinear, etc.) and/or deal with the nuances of manufacturing, the width (W) shown and used for the basis of the present disclosure is preferably an average width of the region. Further it should be understood by one of skill in the art that even though the exemplary representative capillary-like systems depicted herein are shown as having linear characteristics, there is no reason that the capillary-like systems of the present disclosure could not be curvilinear or even combinations of linear and curvilinear designs.

Additionally, in the example provided in FIG. 3, first land area having a width ($W_1$) bifurcates into two additional land areas each having a respective width ($W_2$ and $W_3$). Four scenarios can emerge from the resultant bifurcation of the first land area having a width ($W_1$) into two additional land areas each having a respective width ($W_2$ and $W_3$). These scenarios are:

1. $W_1 = W_2 + W_3$, where $W_2$ and $W_3 \neq 0$;

2. $W_1 < W_2 + W_3$, where $W_2$ and $W_3 \neq 0$;

3. $W_1 = W_2 + W_3$, where $W_2 \neq W_3$, and where $W_2, W_3 > 0$; and,

4. $W_1 < W_2 + W_3$, where $W_2 \neq W_3$, and where $W_2, W_3 > 0$.

It was found advantageous that the values of L, W, and θ be selected in order to provide the best correlation between repeating tessellating unit cells. While one of skill in the art could provide any value of L, W, and θ to suit the need, it was found that $L_1$ (pre-bifurcation) and $L_2$, $L_3$ (post bifurcation) could range from between about 0.005 inches to about 0.750 inches and/or about 0.010 inches to about 0.400 inches and/or about 0.020 inches to about 0.200 inches and/or about 0.03 inches to about 0.100 inches and/or about 0.05 inches to about 0.075 inches. It was also found that $W_1$ (pre-bifurcation) and $W_2$, $W_3$ (post bifurcation) could range from between about 0.005 inches to about 0.200 inches and/or about 0.010 inches to about 0.100 inches and/or about 0.015 inches to about 0.075 inches and/or about 0.020 inches to about 0.050 inches. It was also found that θ could range from about 1 degree to about 180 degrees and/or from about 30 degrees to about 140 degrees and/or from about 30 degrees to about 120 degrees and/or from about 40 degrees to about 85 degrees and/or from about 45 degrees to about 75 degrees and/or from about 50 degrees to about 70 degrees.

It was surprisingly found that a web product formed by the use of a web imprinting surface 222 having a continuous network web imprinting surface 222 with a geometry exhibited by equation 2 (above) and the values of L, W, and θ described above exhibited several remarkable performance enhancements. This included a surprising increase in the observed VFS, and SST values and a surprising decrease in the observed residual water values ($R_w$) over other commercial products tested.

It was surprisingly found that a web product formed by the use of a web imprinting surface 222 having a continuous network web imprinting surface 222 with a geometry exhibited by equation 2 (above) exhibited several remarkable performance enhancements. This included a surprising increase in the observed VFS and SST values and a surprising decrease in the observed residual water values ($R_w$) over other commercial products tested.

The paper products of the present invention is preferably creped, i.e., produced on a papermaking machine culminating with a Yankee dryer to which a partially dried papermaking web is adhered and upon which it is dried and from which it is removed by the action of a flexible creping blade. Creping is a means of mechanically compacting paper in the machine direction. The result is an increase in basis weight (mass per unit area) as well as dramatic changes in many physical properties, particularly when measured in the machine direction. Creping is generally accomplished with a flexible blade, a so-called doctor blade, against a Yankee dryer in an on machine operation.

A Yankee dryer is a large diameter, generally 8-20 foot drum which is designed to be pressurized with steam to provide a hot surface for completing the drying of papermaking webs at the end of the papermaking process. The paper web which is first formed on a foraminous forming carrier, such as a Fourdrinier wire, where it is freed of the copious water needed to disperse the fibrous slurry is generally transferred to a felt or fabric in a so-called press section where dewatering is continued either by mechanically compacting the paper or by some other de-watering method such as through-drying with hot air, before finally being transferred in the semi-dry condition to the surface of the Yankee for the drying to be completed.

While the characteristics of the creped paper webs, particularly when the creping process is preceded by methods of pattern densification, are preferred for practicing the present invention, un-creped paper products are also within the scope of the present invention. Un-creped paper products, a term as used herein, refers to paper products that are non-compressively dried, most preferably by through-drying. Through air dried webs can be pattern densified so that zones of relatively high density are dispersed within a high bulk field. This includes pattern densified products where zones of relatively high density are continuous and the high bulk field is discrete.

To produce un-creped paper product webs, an embryonic web is transferred from the foraminous forming carrier upon which it is laid, to a slower moving, high fiber support transfer fabric carrier. The web is then transferred to a drying fabric upon which it is dried to a final dryness. Such webs can offer some advantages in surface smoothness compared to creped paper webs.

The paper of the present invention may comprise papermaking fibers of both hardwood and softwood types wherein at least about 65% of the papermaking fibers are hardwood and at least about 35% are softwood. It should be realized that any combination of hardwood and softwood fibers can be used. Preferably, the hardwood and softwood fibers are combined in a heterogeneous structure. Alternatively, the hardwood and softwood fibers can be isolated by relegating each to separate layers wherein the paper product comprises an inner layer and at least one outer layer. In any regard, wood pulp in all its varieties can produce the paper products contemplated herein. Other cellulose fibrous pulps, such as cotton linters, bagasse, rayon, etc., can also be used. Wood pulps useful herein include chemical pulps such as, sulfite and sulfate (sometimes called Kraft) pulps as well as mechanical pulps including for example, ground wood, ThermoMechanical Pulp (TMP) and Chemi-ThermoMechanical Pulp (CTMP). Pulps derived from both deciduous and coniferous trees can be used.

"Hardwood pulps" as used herein refers to fibrous pulp derived from the woody substance of deciduous trees (angiosperms). "Softwood pulps" are fibrous pulps derived from the woody substance of coniferous trees (gymnosperms). Blends of hardwood Kraft pulps, especially *eucalyptus*, and northern softwood Kraft (NSK) pulps are particularly suitable for making the paper product webs of the present invention. A first embodiment of the present invention can provide for heterogeneous web layers where, most preferably, hardwood pulps such as *eucalyptus* are combined with northern softwood Kraft pulps. Another embodiment of the present invention can provide for layered paper product webs where, most preferably, hardwood pulps such as *eucalyptus* are used for outer layer(s) and northern softwood Kraft pulps are used for the inner layer(s). Also applicable to the present invention are fibers derived from recycled paper, which may contain any or all of the above categories of fibers. Further, multiple papermaking furnishes containing the papermaking fibers that will be contacted by any particulate filler is predominantly of the hardwood type, preferably of content of at least about 80% hardwood.

Additionally, fibers forming the products of the present invention may be spun from polymer melt compositions via suitable spinning operations, such as meltblowing and/or spinbonding and/or they may be obtained from natural sources such as vegetative sources, for example trees. Such fibers may be monocomponent and/or multicomponent. For example, the fibrous elements may comprise bicomponent fibers and/or filaments. The bicomponent fibers and/or filaments may be in any form, such as side-by-side, core and sheath, islands-in-the-sea and the like. Non-limiting examples of filaments include meltblown and/or spunbond filaments. Non-limiting examples of polymers that can be spun into filaments include natural polymers, such as starch, starch derivatives, cellulose, such as rayon and/or lyocell, and cellulose derivatives, hemicellulose, hemicellulose derivatives, and synthetic polymers including, but not limited to thermoplastic polymer filaments, such as polyesters, nylons, polyolefins such as polypropylene filaments, polyethylene filaments, and biodegradable thermoplastic fibers such as polylactic acid filaments, polyhydroxyalkanoate filaments, polyesteramide filaments and polycaprolactone filaments. Non-limiting examples of fibers include pulp fibers, such as wood pulp fibers, and synthetic staple fibers such as polypropylene, polyethylene, polyester, copolymers thereof, rayon, glass fibers and polyvinyl alcohol fibers. Staple fibers may be produced by spinning a filament tow and then cutting the tow into segments of less than 5.08 cm (2 in.) thus producing fibers.

In addition to the various wood pulp fibers, other cellulosic fibers such as cotton linters, rayon, lyocell and bagasse fibers can be used in the fibrous structures of the present invention. The fibrous structure or material of the web products which are the subject of this invention may be a single-ply or a multi-ply fibrous structure suitable for being converted into a through air dried perforated product. Other materials can be added to the aqueous papermaking furnish or the embryonic web to impart other characteristics to the product or improve the papermaking process. For example, small amounts of chemical functional agents such as wet strength or dry strength binders, retention aids, surfactants, size, chemical softeners, crepe facilitating compositions are frequently included but these are typically only used in minor amounts.

A cationic charge biasing species can be added to the papermaking process for controlling zeta potential of an aqueous papermaking furnish. These materials are used because most of the solids in nature have negative surface charges, including the surfaces of cellulosic fibers and fines and most inorganic fillers. One traditionally used cationic charge biasing species is alum. Relatively low molecular weight cationic synthetic polymers preferably having a molecular weight of no more than about 500,000 and more preferably no more than about 200,000, or even about 100,000 can be used for charge biasing. The charge densities of such low molecular weight cationic synthetic polymers are relatively high. These charge densities range from about 4 to about 8 equivalents of cationic nitrogen per kilogram of polymer. One example material is Cypro 514®, a product of Cytec, Inc. of Stamford, Conn. The use of such materials is expressly allowed within the practice of the present invention.

Additionally, high surface area, high anionic charge microparticles can be used to improve formation, drainage, strength, and retention. Common materials for this purpose are silica colloid, or bentonite clay.

If permanent wet strength is desired, the group of chemicals: including polyamide-epichlorohydrin, polyacrylamides, styrene-butadiene latices; insolubilized polyvinyl alcohol; urea-formaldehyde; polyethyleneimine; chitosan polymers and mixtures thereof can be added to the papermaking furnish or to the embryonic web. Polyamide-epichlorohydrin resins are cationic wet strength resins which have been found to be of particular utility. Suitable types of such resins are described in U.S. Pat. Nos. 3,700,623 and 3,772,076. Polyamide-epichlorohydrin resins are available from Hercules, Inc. of Wilmington, Del., which markets such resin under the mark Kymene® 557H®.

Many paper products must have limited wet strength because of the need to dispose of them through toilets into septic or sewer systems. If wet strength is imparted to these products, it is preferred to be fugitive wet strength characterized by a decay of part or all of its potency in the presence of water. If fugitive wet strength is desired, the binder materials can be chosen from the group consisting of dialdehyde starch or other resins with aldehyde functionality such as Co-Bond 1000® offered by National Starch and Chemical Company, Parez® 750® offered by Cytec of Stamford, Conn. and the resin described in U.S. Pat. No. 4,981,557.

Surfactants may be used to treat the paper product webs for enhanced absorbency. The level of surfactant preferably ranges from about 0.01% to about 2.0% by weight, based on the dry fiber weight of the paper product. Surfactants preferably have alkyl chains with eight or more carbon atoms. Exemplary anionic surfactants are linear alkyl sulfonates, and alkylbenzene sulfonates. Exemplary nonionic surfactants are alkylglycosides including alkylglycoside esters such as Crodesta® SL-40® available from Croda, Inc. (New York, N.Y.); alkylglycoside ethers as described in U.S. Pat. No. 4,011,389, issued to W. K. Langdon, et al. on Mar. 8, 1977; and alkylpolyethoxylated esters such as Pegosperse® 200 ML available from Glyco Chemicals, Inc. (Greenwich, Conn.) and IGEPAL® RC-520® available from Rhone Poulenc Corporation (Cranbury, N.J.).

The present invention is further applicable to the production of multi-layered paper product webs. Multi-layered paper product structures and methods of forming multi-layered paper product structures are described in U.S. Pat. Nos. 3,994,771; 4,300,981; 4,166,001; and European Patent Publication No. 0 613 979 A1. The layers preferably comprise different fiber types, the fibers typically being relatively long softwood and relatively short hardwood fibers as used in multi-layered paper product making. Multi-layered paper product webs resultant from the present invention comprise at least two superposed layers, an inner layer and at least one outer layer contiguous with the inner layer. Preferably, the multi-layered paper products comprise three superposed layers, an inner or center layer, and two outer layers, with the inner layer located between the two outer layers. The two outer layers preferably comprise a primary filamentary constituent of relatively short paper making fibers having an average fiber length between about 0.5 and about 1.5 mm, preferably less than about 1.0 mm. These short paper making fibers typically comprise hardwood fibers, preferably hardwood Kraft fibers, and most preferably derived from *euca-*

*lyptus.* The inner layer preferably comprises a primary filamentary constituent of relatively long paper making fiber having an average fiber length of least about 2.0 mm. These long paper making fibers are typically softwood fibers, preferably, northern softwood Kraft fibers. Preferably, the majority of the particulate filler of the present invention is contained in at least one of the outer layers of the multi-layered paper product web of the present invention. More preferably, the majority of the particulate filler of the present invention is contained in both of the outer layers. In any regard, both single-ply and multi-ply paper products can be produced from the webs of the present invention.

Softening agents, such as quaternary ammonium compounds, can be added to the papermaking slurry. Specific examples of ester-functional quaternary ammonium compounds having the structures detailed above and suitable for use in the present invention may include the diester dialkyl dimethyl ammonium salts such as diester ditallow dimethyl ammonium chloride, monoester ditallow dimethyl ammonium chloride, diester ditallow dimethyl ammonium methyl sulfate, diester di(hydrogenated)tallow dimethyl ammonium methyl sulfate, diester di(hydrogenated)tallow dimethyl ammonium chloride, and mixtures thereof. Diester ditallow dimethyl ammonium chloride and diester di(hydrogenated) tallow dimethyl ammonium chloride are particularly preferred. These particular materials are available from Witco Chemical Company Inc. of Dublin, Ohio under the tradename "ADOGEN® SDMC". Other types of suitable quaternary ammonium compounds for use in the present invention are described in U.S. Pat. Nos. 5,543,067; 5,538,595; 5,510,000; 5,415,737, and European Patent Application No. 0 688 901 A2. Additionally, di-quaternary variations of the ester-functional quaternary ammonium compounds can also be used, and are meant to fall within the scope of the present invention. While not wishing to be bound by theory, it is believed that the ester moiety(ies) of the quaternary compounds provides a measure of biodegradability. It is believed the ester-functional quaternary ammonium compounds used herein biodegrade more rapidly than do conventional dialkyl dimethyl ammonium chemical softeners.

Additional chemical softening agents suitable for addition to papermaking slurries comprise organo-reactive polydimethyl siloxane ingredients, including amino functional polydimethyl siloxane. A preferred chemical softening agent combines an organo-reactive silicone with a suitable quaternary ammonium compound. An organo-reactive silicone such as amino polydimethyl siloxane is applied at an amount ranging from about 0% to about 50% and preferably from about 5% to about 15% by weight based on the weight of the polysiloxane relative to the total softening agent. Suitable fatty acids comprise $C_6$-$C_{23}$ linear, branched, saturated, or unsaturated analogs. A preferred fatty acid is isostearic acid. One particularly preferred chemical softening agent contains from about 0.1% to about 70% of a polysiloxane compound.

Polysiloxanes can also include polymeric, oligomeric, copolymeric, and other multiple monomeric siloxane materials. As used herein, the term polysiloxane shall include all of such polymeric, oligomeric, copolymeric, and other multiple-monomeric materials. Additionally, the polysiloxane can be straight chained, branched chain, or have a cyclic structure. References disclosing polysiloxanes include U.S. Pat. Nos. 2,826,551; 3,964,500; 4,364,837; 5,059,282; 5,529,665; 5,552,020; and British Patent 849,433.

Products of the present invention can also be embossed. "Embossed" as used herein with respect to a fibrous structure means a fibrous structure that has been subjected to a process which converts a smooth surfaced fibrous structure to a decorative surface by replicating a design on one or more emboss rolls, which form a nip through which the fibrous structure passes. Embossed does not include creping, microcreping, printing or other processes that may impart a texture and/or decorative pattern to a fibrous structure. In one example, the embossed fibrous structure comprises deep nested embossments that exhibit an average peak of the embossment to valley of the embossment difference of greater than 600 μm and/or greater than 700 μm and/or greater than 800 μm and/or greater than 900 μm as measured using MicroCAD.

Figure 6:
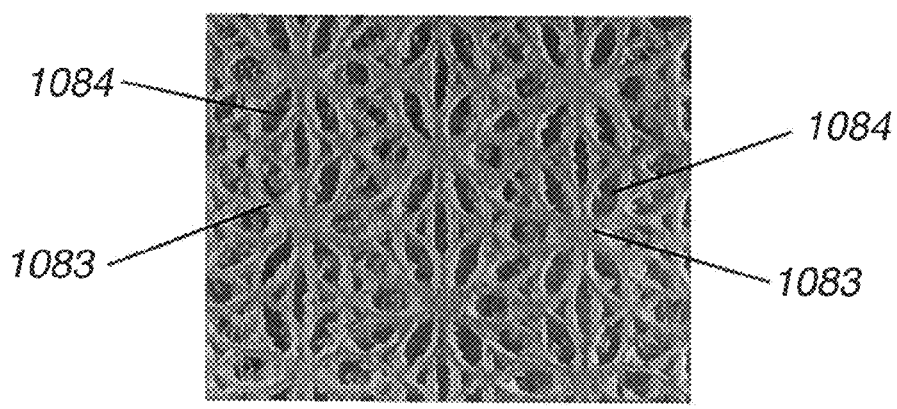
FIG. 6 is a photograph of the opposite side of the paper web of FIG. 4 showing the relatively low density domes dispersed throughout a relatively high density, continuous network region; and, FIGS. 7-11 show exemplary schematic illustrations of exemplary patterns suitable for use as continuous network web imprinting surfaces.
Figure 7:
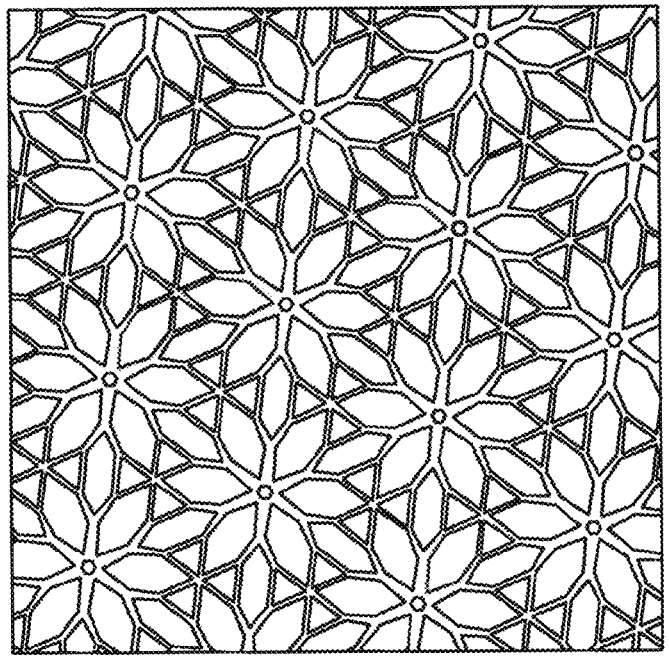
FIGS. 7-8 show exemplary patterns of relatively low density domes dispersed throughout a relatively high density, continuous network region having a fractal geometric pattern.
Figure 8:
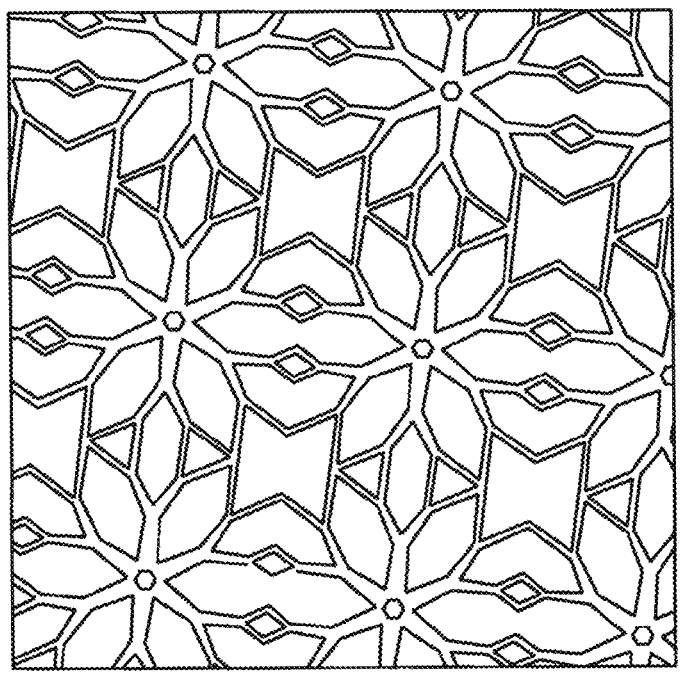
Figure 9:
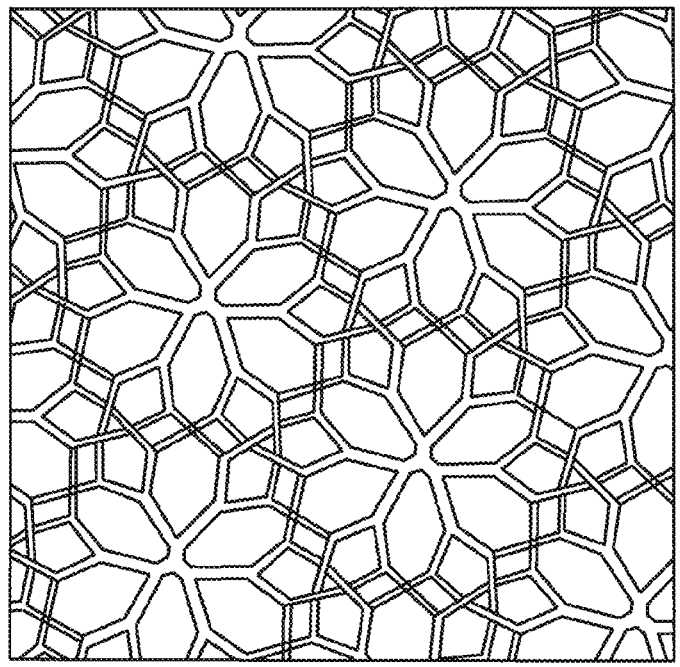
FIG. 9 shows an exemplary pattern of relatively low density domes dispersed throughout a relatively high density, continuous network region having a constructal geometric pattern.
Figure 10:
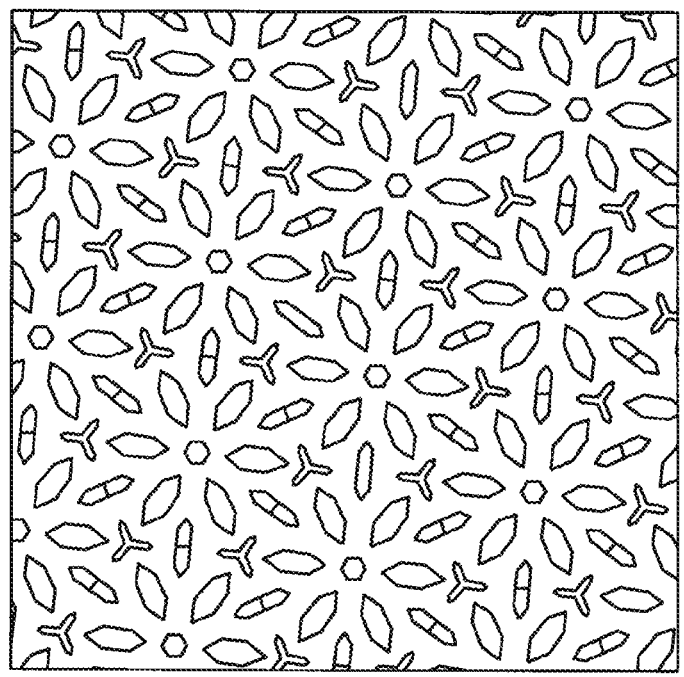
FIG. 10 shows an exemplary pattern of relative high density areas dispersed throughout a relatively low density, continuous network region having a fractal geometric pattern.
Figure 11:
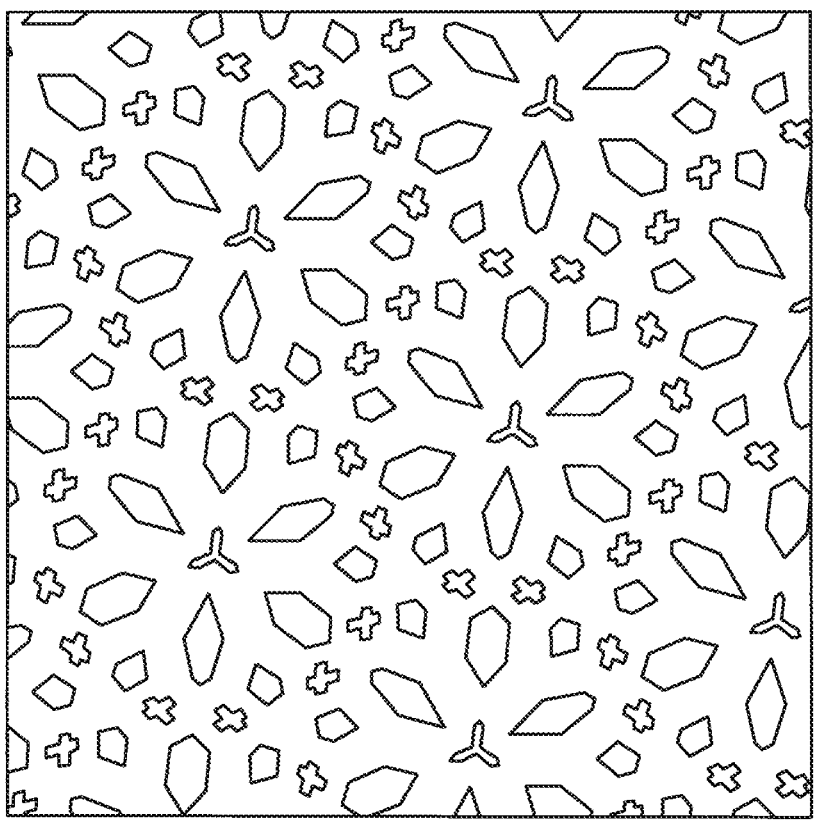
FIG. 11 shows an exemplary pattern of relative high density areas dispersed throughout a relatively low density, continuous network region having a constructal geometric pattern.

As shown in FIGS. 4-6, an exemplary paper product produced according to the present invention is macroscopically mono-planar where the plane of the paper defines its X-Y directions and having a Z direction orthogonal thereto. The molded web formed by the foraminous imprinting member shown in FIG. 1 is characterized in having relatively high tensile strength and flexibility for a given level of web basis weight and web caliper H. This relatively high tensile strength and flexibility is believed to be due, at least in part, to the difference in density between the relatively high density region 1083 and the relatively low density region 1084. Web strength is enhanced by pressing a portion of the intermediate web between the first dewatering felt 320 and the web imprinting surface 220 to form the relatively high density region 1083. Simultaneously compacting and dewatering a portion of the web provides fiber to fiber bonds in the relatively high density region for carrying loads.

An exemplary paper product produced according to the apparatus and process of the present invention (shown in FIG. 1) has at least two regions. The first region comprises an imprinted region which is imprinted against the web imprinting surface 220 of the foraminous printing member 219. The imprinted region is preferably an essentially continuous network. The relatively low density region 1084 deflected into the deflection conduit portion 230 of the imprinting member 219 provides bulk for enhancing absorbency. In addition, pressing the intermediate web draws papermaking fibers into the deflection conduit portion 230 to form an intermediate density region, thereby increasing the web macro-caliper H. Increased web caliper H decreases the web's apparent density (web basis weight divided by web caliper H). Web flexibility increases as web stiffness decreases. Alternatively, an exemplary paper product produced according to the apparatus and process of the present invention (shown in FIG. 2) has at least two regions. The first region would comprise a plurality of imprinted region which are imprinted against the web imprinting surface 220*a* of the foraminous printing member 219*a*. The imprinted region is preferably an essentially discontinuous network. A relatively low density region is deflected into the continuous deflection conduit portion 230*a* of the imprinting member 219 provides bulk for enhancing absorbency.

Referring again to a product produced according to the imprinting member 210 of FIG. 1, the difference in density between the relatively high density region 1083 and the relatively low density region 1084 is provided, in part, by deflecting a portion of the embryonic web into the deflection conduit portion 230 of the imprinting member 219 to provide a non-monoplanar intermediate web upstream of the compression nip. A monoplanar web carried through the compression nip would be subject to some uniform compaction, thereby increasing the minimum density in the molded web. The portions of the non-monoplanar intermediate web in the deflection conduit portion 230 avoid such uniform compaction, and therefore maintain a relatively low density. However, without being bound by theory, it is believed the relatively low density region 1084 and the relatively high density region 1083 may have generally equivalent basis weights. In any regard, the density of the relatively low density region 1084 and the relatively high density region 1083 can be measured according to U.S. Pat. Nos. 5,277,761 and 5,443,691.

The molded web may also be foreshortened, as is known in the art. Foreshortening can be accomplished by creping the molded web from a rigid surface such as a drying cylinder. A Yankee drying drum can be used for this purpose. During foreshortening, at least one foreshortening ridge can be produced in the relatively low density regions 1084 of the molded web). Such at least one foreshortening ridge is spaced apart from the MD/CD plane of the molded web in the Z-direction. Creping can be accomplished with a doctor blade according to U.S. Pat. No. 4,919,756. Alternatively or additionally, foreshortening may be accomplished via wet micro-contraction as taught in U.S. Pat. No. 4,440,597 and/or by fabric creping as would be known to those of skill in the art.

"Basis Weight" as used herein is the weight per unit area of a sample reported in lbs/3000 ft$^2$ or g/m$^2$. Products of the present invention may have a Basis Weight of greater than 15 g/m$^2$ (9.2 lbs/3000 ft$^2$) to about 120 g/m$^2$ (73.8 lbs/3000 ft$^2$) and/or from about 15 g/m$^2$ (9.2 lbs/3000 ft$^2$) to about 110 g/m$^2$ (67.7 lbs/3000 ft$^2$) and/or from about 20 g/m$^2$ (12.3 lbs/3000 ft$^2$) to about 100 g/m$^2$ (61.5 lbs/3000 ft$^2$) and/or from about 30 (18.5 lbs/3000 ft$^2$) to 90 g/m$^2$ (55.4 lbs/3000 ft$^2$). In addition, products of the present invention may exhibit a basis weight between about 40 g/m$^2$ (24.6 lbs/3000 ft$^2$) to about 120 g/m$^2$ (73.8 lbs/3000 ft$^2$) and/or from about 50 g/m$^2$ (30.8 lbs/3000 ft$^2$) to about 110 g/m$^2$ (67.7 lbs/3000 ft$^2$) and/or from about 55 g/m$^2$ (33.8 lbs/3000 ft$^2$) to about 105 g/m$^2$ (64.6 lbs/3000 ft$^2$) and/or from about 60 (36.9 lbs/3000 ft$^2$) to 100 g/m$^2$ (61.5 lbs/3000 ft$^2$).

Products of the present invention may exhibit a Total Dry Tensile value of less than about 3000 g/25.4 mm and/or less than 2000 g/25.4 mm and/or less than 1875 g/25.4 mm and/or less than 1850 g/25.4 mm and/or less than 1800 g/25.4 mm and/or less than 1700 g/25.4 mm and/or less than 1600 g/25.4 mm and/or less than 1560 g/25.4 mm and/or less than 1500 g/25.4 mm to about 400 g/25.4 mm and/or to about 600 g/25.4 mm and/or to about 800 g/25.4 mm and/or to about 1000 g/25.4 mm. In yet another example, single-ply products may exhibit a Total Dry Tensile of less than about 1560 g/25.4 mm and/or less than 1500 g/25.4 mm and/or less than 1400 g/25.4 mm and/or less than 1300 g/25.4 mm to about 300 g/25.4 mm and/or 400 g/25.4 mm and/or to about 600 g/25.4 mm and/or to about 800 g/25.4 mm and/or to about 1000 g/25.4 mm.

Products of the present invention may exhibit an initial Total Wet Tensile Strength value of less than 800 g/25.4 mm and/or less than 600 g/25.4 mm and/or less than 450 g/25.4 mm and/or less than 300 g/25.4 mm and/or less than about 225 g/25.4 mm.

Products of the present invention may exhibit a Density (measured at 95 g/in$^2$) of less than about 0.60 g/cm$^3$ and/or less than about 0.30 g/cm$^3$ and/or less than about 0.20 g/cm$^3$ and/or less than about 0.10 g/cm$^3$ and/or less than about 0.07 g/cm$^3$ and/or less than about 0.05 g/cm$^3$ and/or from about 0.01 g/cm$^3$ to about 0.20 g/cm$^3$ and/or from about 0.02 g/cm$^3$ to about 0.10 g/cm$^3$.

"Density" as used herein is calculated as the quotient of the Basis Weight expressed in grams per square meter divided by the Caliper expressed in microns. The resulting Density is expressed as grams per cubic centimeters (g/cm$^3$ or g/cc). Paper products of the present invention may have Densities greater than 0.04 g/cm$^3$ and/or greater than 0.05 g/cm$^3$ and/or greater than 0.06 g/cm$^3$ and/or greater than 0.07 g/cm$^3$ and/or less than 0.10 g/cm$^3$ and/or less than 0.09 g/cm$^3$ and/or less than 0.08 g/cm$^3$. Paper products of the present invention may exhibit a density ranging from about 0.045 g/cm$^3$ to about 0.095 g/cm$^3$.

Analytical Procedures

The following test methods are representative of the techniques utilized to determine the physical characteristics of the multi-ply paper products associated therewith.

1. Sample Conditioning and Preparation

Unless otherwise indicated, samples are conditioned according to Tappi Method #T402OM-88. Paper samples are conditioned for at least 2 hours at a relative humidity of 48 to 52% and within a temperature range of 22° to 24° C. Sample preparation and all aspects of testing using the following methods are confined to a constant temperature and humidity room.

2. Basis Weight

Basis weight is measured by preparing one or more samples of a certain area (m$^2$) and weighing the sample(s) of a fibrous structure according to the present invention and/or a paper product comprising such fibrous structure on a top loading balance with a minimum resolution of 0.01 g. The balance is protected from air drafts and other disturbances using a draft shield.

Weights are recorded when the readings on the balance become constant. The average weight (g) is calculated and the average area of the samples (m$^2$). The basis weight (g/m$^2$) is calculated by dividing the average weight (g) by the average area of the samples (m$^2$).

3. Bulk and Caliper

The density of multi-layered paper products, as that term is used herein, is the average density calculated as the basis weight of that paper divided by the caliper, with the appropriate unit conversions incorporated therein. Caliper of the multi-layered paper product, as used herein, is the thickness of the paper when subjected to a compressive load of 95 g/in$^2$ (15.5 g/cm$^2$). Bulk density is the reciprocal of the measured density.

Macro-caliper as used herein means the macroscopic thickness of the sample. The sample is placed on a horizontal flat surface and confined between the flat surface and a load foot having a horizontal loading surface, where the load foot loading surface has a circular surface area of about 3.14 square inches and applies a confining pressure of about 15 g/square cm (0.21 psi) to the sample. The macro-caliper is the resulting gap between the flat surface and the load foot loading surface. Such measurements can be obtained on a VIR Electronic Thickness Tester Model II available from Thwing-Albert, Philadelphia, Pa. The macro-caliper is an average of at least five measurements.

4. Total Tensile Strength

Total tensile strength (TT) as used herein means the sum of the machine and cross-machine maximum strength (in g/in). The value of TT is reported in g/in. The maximum strength is measured using a tensile test machine, such as an Intelect II STD, available from Thwing-Albert, Philadelphia, Pa. The maximum strength is measured at a cross head speed of 1 inch per minute for creped samples, and 0.1 inch per minute for uncreped handsheet samples. For handsheets, only the machine direction maximum strength is measured, and the value of TT is equal to twice this machine direction maximum strength divided by the basis weight. The value of TT is reported as an average of at least five measurements.

5. Residual Water ($R_w$) Test Method

This method measures the amount of distilled water absorbed by a paper product. In general a finite amount of distilled water is deposited to a standard surface. A paper towel is then placed over the water for a given amount of time. After the elapsed time the towel is removed and the amount of water left behind and amount of water absorbed are calculated.

The temperature and humidity are controlled within the following limits:
Temperature: 23° C.±1° C. (73° F.±2° F.)
Relative humidity: 50%±2%

The following equipment is used in this test method. A top loading balance is used with sensitivity: ±0.01 grams or better having the capacity of grams minimum. A pipette is used having a capacity of 5 mL and a Sensitivity±1 mL. A Formica™ Tile 6 in×7 in is used. A stop watch or digital timer capable of measuring time in seconds to the nearest 0.1 seconds is also used.

Sample and Solution Preparation For this test method, distilled water is used, controlled to a temperature of 23° C.±1° C. (73° F.±2° F.). For this method, a useable unit is described as one finished product unit regardless of the number of plies. Condition the rolls or useable units of products, with wrapper or packaging materials removed in a room conditioned at 50%±2% relative humidity, 23° C.±1° C. (73° F.±2° F.) for a minimum of two hours. Do not test useable units with defects such as wrinkles, tears, holes, etc.

Paper Samples

Remove and discard at least the four outermost useable units from the roll. For testing remove useable units from each roll of product submitted as indicated below. For Paper Towel products, select five (5) usable units from the roll. For Paper Napkins that are folded, cut and stacked, select five (5) useable units from the sample stack submitted for testing. For all napkins, either double or triple folded, unfold the useable units to their largest square state. One-ply napkins will have one 1-ply layer; 2-ply napkins will have one 2-ply layer. With 2-ply napkins, the plies may be either embossed (just pressed) together, or embossed and laminated (pressed and glued) together. Care must be taken when unfolding 2-ply useable units to keep the plies together. If the unfolded useable unit dimensions exceed 279 mm (11 inches) in either direction, cut the useable unit down to 279 mm (11 inches). Record the original useable unit size if over 279 mm. (11 inches). If the unfolded useable unit dimensions are less than 279 mm (11 inches) in either direction, record the useable unit dimensions.

Place the Formica Tile (standard surface) in the center of the cleaned balance surface. Wipe the Formica Tile to ensure that it is dry and free of any debris. Tare the balance to get a zero reading. Slowly dispense 2.5 mL of distilled water onto the center of the standard surface using the pipette. Record the weight of the water to the nearest 0.001 g. Drop 1 useable unit of the paper towel onto the spot of water with the outside ply down. Immediately start the stop watch. The sample should be dropped on the spot such that the spot is in the center of the sample once it is dropped. Allow the paper towel to absorb the distilled water for 30 seconds after hitting the stop watch. Remove the paper from the spot after the 30 seconds has elapsed. The towel must be removed when the stop watch reads 30 seconds±0.1 sec. The paper towel should be removed using a quick vertical motion. Record the weight of the remaining water on the surface to the nearest 0.001 g.

Calculations $$RWV\ Average\ (g) = \frac{\sum_{n=1}^{5}(Amount\ of\ H_2O\ Remaining\ (g))}{n}$$

where:
n=the number of replicates which for this method is 5.
Record the RWV to the nearest 0.001 g.

6. Slope of the Square Root of Time (SST) Test Method

The SST method measures rate over a wide spectrum of time to capture a view of the product pick-up rate over the useful lifetime. In particular, the method measures the absorbency rate via the slope of the mass versus the square root of time from 2-15 seconds.

Overview

The absorption (wicking) of water by a fibrous sample is measured over time. A sample is placed horizontally in the instrument and is supported by an open weave net structure that rests on a balance. The test is initiated when a tube connected to a water reservoir is raised and the meniscus makes contact with the center of the sample from beneath, at a small negative pressure. Absorption is controlled by the ability of the sample to pull the water from the instrument for approximately 20 seconds. Rate is determined as the slope of the regression line of the outputted weight vs sqrt(time) from 2 to 15 seconds.

Apparatus

Conditioned Room—Temperature is controlled from 73° F.±2° F. (23° C.±1° C.). Relative Humidity is controlled from 50%±2%

Sample Preparation—Product samples are cut using hydraulic/pneumatic precision cutter into 3.375 inch diameter circles.

Capacity Rate Tester (CRT)—The CRT is an absorbency tester capable of measuring capacity and rate. The CRT consists of a balance (0.001 g), on which rests on a woven grid (using nylon monofilament line having a 0.014" diameter) placed over a small reservoir with a delivery tube in the center. This reservoir is filled by the action of solenoid valves, which help to connect the sample supply reservoir to an intermediate reservoir, the water level of which is monitored by an optical sensor. The CRT is run with a −2 mm water column, controlled by adjusting the height of water in the supply reservoir.

Software—LabView based custom software specific to CRT Version 4.2 or later.

Water—Distilled water with conductivity <10 μS/cm (target <5 μS/cm)@25° C.

Sample Preparation

For this method, a usable unit is described as one finished product unit regardless of the number of plies. Condition all samples with packaging materials removed for a minimum of 2 hours prior to testing. Discard at least the first ten usable units from the roll. Remove two usable units and cut one 3.375-inch circular sample from the center of each usable unit for a total of 2 replicates for each test result. Do not test samples with defects such as wrinkles, tears, holes, etc. Replace with another usable unit which is free of such defects Sample Testing Pre-Test Set-Up 1. The water height in the reservoir tank is set −2.0 mm below the top of the support rack (where the towel sample will be placed).
2. The supply tube (8 mm I.D.) is centered with respect to the support net.
3. Test samples are cut into circles of 3-⅜" diameter and equilibrated at Tappi environment conditions for a minimum of 2 hours.

Test Description

1. After pressing the start button on the software application, the supply tube moves to 0.33 mm below the water height in the reserve tank. This creates a small meniscus of water above the supply tube to ensure test initiation. A valve between the tank and the supply tube closes, and the scale is zeroed.

2. The software prompts you to "load a sample". A sample is placed on the support net, centering it over the supply tube, and with the side facing the outside of the roll placed downward.
3. Close the balance windows, and press the "OK" button—the software records the dry weight of the circle.
4. The software prompts you to "place cover on sample". The plastic cover is placed on top of the sample, on top of the support net. The plastic cover has a center pin (which is flush with the outside rim) to ensure that the sample is in the proper position to establish hydraulic connection. Four other pins, 1 mm shorter in depth, are positioned 1.25-1.5 inches radially away from the center pin to ensure the sample is flat during the test. The sample cover rim should not contact the sheet. Close the top balance window and click "OK".
5. The software re-zeroes the scale and then moves the supply tube towards the sample. When the supply tube reaches its destination, which is 0.33 mm below the support net, the valve opens (i.e., the valve between the reserve tank and the supply tube), and hydraulic connection is established between the supply tube and the sample. Data acquisition occurs at a rate of 5 Hz, and is started about 0.4 seconds before water contacts the sample.
6. The test runs for at least 20 seconds. After this, the supply tube pulls away from the sample to break the hydraulic connection.
7. The wet sample is removed from the support net. Residual water on the support net and cover are dried with a paper towel.
8. Repeat until all samples are tested.
9. After each test is run, a *.txt file is created (typically stored in the CRT/data/rate directory) with a file name as typed at the start of the test. The file contains all the test set-up parameters, dry sample weight, and cumulative water absorbed (g) vs. time (sec) data collected from the test.

Calculation of Rate of Uptake

Take the raw data file that includes time and weight data.

First, create a new time column that subtracts 0.4 seconds from the raw time data to adjust the raw time data to correspond to when initiation actually occurs (about 0.4 seconds after data collection begins).

Second, create a column of data that converts the adjusted time data to square root of time data (e.g., using a formula such as SQRT( ) within Excel).

Third, calculate the slope of the weight data vs the square root of time data (e.g., using the SLOPE( ) function within Excel, using the weight data as the y-data and the sqrt(time) data as the x-data, etc.). The slope should be calculated for the data points from 2 to 15 seconds, inclusive (or 1.41 to 3.87 in the sqrt(time) data column).

Calculation of Slope of the Square Root of Time (SST)

The start time of water contact with the sample is estimated to be 0.4 seconds after the start of hydraulic connection is established between the supply tube and the sample (CRT Time). This is because data acquisition begins while the tube is still moving towards the sample, and incorporates the small delay in scale response. Thus, "time zero" is actually at 0.4 seconds in CRT Time as recorded in the *.txt file.

The slope of the square root of time (SST) from 2-15 seconds is calculated from the slope of a linear regression line from the square root of time between (and including) 2 to 15 seconds (x-axis) versus the cumulative grams of water absorbed. The units are g/sec$^{0.5}$.

Reporting Results

Report the average slope to the nearest 0.01 g/s$^{0.5}$.

7. Vertical Full Sheet (VFS) and Horizontal Full Sheet (HFS) Test Methods

The Vertical Full Sheet (VFS) and Horizontal Full Sheet (HFS) test methods both determine the amount of distilled water absorbed and retained by a fibrous structure of the present invention. This method is performed by first weighing a sample of the fibrous structure to be tested (referred to herein as the "dry weight of the sample"), then thoroughly wetting the sample, draining the wetted sample in a vertical position and then reweighing (referred to herein as "wet weight of the sample"). The absorptive capacity of the sample is then computed as the amount of water retained in units of grams of water absorbed by the sample. When evaluating different fibrous structure samples, the same size of fibrous structure is used for all samples tested.

The apparatus for determining the VFS capacity of fibrous structures comprises the following:

1. An electronic balance with a sensitivity of at least ±0.01 g and a minimum capacity of 1200 g. The balance should be positioned on a balance table and slab to minimize the vibration effects of floor/benchtop weighing. The balance should also have a special balance pan to be able to handle the size of the sample tested (i.e.; a fibrous structure sample of about 11 in. (27.9 cm) by 11 in. (27.9 cm)). The balance pan can be made out of a variety of materials. Plexiglass is a common material used.

2. A sample support rack and sample support rack cover is also required. Both the rack and cover are comprised of a lightweight metal frame, strung with 0.012 in. (0.305 cm) diameter monofilament so as to form a grid. The size of the support rack and cover is such that the sample size can be conveniently placed between the two.

The VFS test is performed in an environment maintained at 23° C.±1° C. and 50%±2% relative humidity. A water reservoir or tub is filled with distilled water at 23° C.±1° C. to a depth of 3 in (7.6 cm).

Eight 19.05 cm (7.5 inch)×19.05 cm (7.5 inch) to 27.94 cm (11 inch)×27.94 cm (11 in) samples of a fibrous structure to be tested are carefully weighed on the balance. The empty sample support rack is placed on the balance with the special balance pan described above. The balance is then zeroed (i.e., tared). One sample is carefully placed on the sample support rack. The weight of the sample is recorded to the nearest 0.01 g as the dry weight of the sample. The support rack cover is placed on top of the support rack. The sample (now sandwiched between the rack and cover) is submerged in the water reservoir. After the sample is submerged for 30 seconds, the sample support rack and cover are gently raised out of the reservoir.

The sample and support rack are allowed to drain horizontally for 120 sec±5 sec, taking care not to excessively shake or vibrate the sample. While the sample is draining, the rack cover is carefully removed and all excess water is wiped from the support rack. The wet sample and the support rack are weighed on the previously tared balance. The weight is recorded to the nearest 0.01 g. This is the wet weight of the sample after draining horizontally.

The sample and cover are then allowed to drain vertically for 60 sec±5 sec, taking care not to excessively shake or vibrate the sample. While the sample is draining all excess water is wiped from the support rack. The wet sample and the support rack are weighed on the previously tared balance. The weight is recorded to the nearest 0.01 g. This is the wet weight of the sample after draining vertically.

The procedure is repeated for with another sample of the fibrous structure, however, the sample is positioned on the support rack such that the sample is rotated 90° compared to the position of the first sample on the support rack.

The gram per gram fibrous structure sample absorptive capacity is defined as (wet weight of the sample–dry weight of the sample)/dry weight of the sample. So, the HFS g/g is (the wet weight of the sample after draining horizontally–the dry weight of the sample)/dry weight of the sample. The VFS g/g is the (wet weight of the sample after draining vertically–the dry weight of the sample)/dry weight of the sample. The calculated VFS is the average of the absorptive capacities of the two samples of the fibrous structure in the two different orientations.

EXAMPLES

Example 1

A pilot scale Fourdrinier papermaking machine is used in the present example. A 3% by weight aqueous slurry of northern softwood kraft (NSK) pulp is made up in a conventional re-pulper. The NSK slurry is refined gently and a 2% solution of a permanent wet strength resin (i.e. Kymene 5221 marketed by Hercules incorporated of Wilmington, Del.) is added to the NSK stock pipe at a rate of 1% by weight of the dry fibers. The adsorption of Kymene 5221 to NSK is enhanced by an in-line mixer. A 1% solution of Carboxy Methyl Cellulose (CMC) (i.e. FinnFix 700 marketed by C.P. Kelco U.S. Inc. of Atlanta, Ga.) is added after the in-line mixer at a rate of 0.2% by weight of the dry fibers to enhance the dry strength of the fibrous substrate. A 3% by weight aqueous slurry of *Eucalyptus* fibers is made up in a conventional re-pulper. A 1% solution of defoamer (i.e. BuBreak 4330 marketed by Buckman Labs, Memphis Tenn.) is added to the *Eucalyptus* stock pipe at a rate of 0.25% by weight of the dry fibers and its adsorption is enhanced by an in-line mixer.

The NSK furnish and the *Eucalyptus* fibers are combined in the head box and deposited onto a Fourdrinier wire homogenously to form an embryonic web. The Fourdrinier wire Dewatering occurs through the Foudrinier wire and is assisted by a deflector and vacuum boxes. The Fourdrinier wire is of a 5-shed, satin weave configuration having 84 machine-direction and 76 cross-machine-direction monofilaments per inch, respectively. The embryonic wet web is transferred from the Fourdrinier wire, at a fiber consistency of about 15% to about 25% at the point of transfer, to a photo-polymer fabric having a fractal pattern cells, about 25 percent knuckle area and 22 mils of photo-polymer depth. The speed differential between the Fourdrinier wire and the patterned transfer/imprinting fabric is about −3% to about +3%. Further de-watering is accomplished by vacuum assisted drainage until the web has a fiber consistency of about 20% to about 30%. The patterned web is pre-dried by air blow-through to a fiber consistency of about 65% by weight. The web is then adhered to the surface of a Yankee dryer with a sprayed creping adhesive comprising 0.25% aqueous solution of Polyvinyl Alcohol (PVA). The fiber consistency is increased to an estimated 96% before the dry creping the web with a doctor blade. The doctor blade has a bevel angle of about 25 degrees and is positioned with respect to the Yankee dryer to provide an impact angle of about 81 degrees; the Yankee dryer is operated at about 600 fpm (feet per minute) (about 183 meters per minute). The dry web is formed into roll at a speed of 560 fpm (171 meters per minutes).

Two plies of the web are formed into paper towel products by embossing and laminating them together using PVA adhesive. The paper towel has about 53 g/m² basis weight and contains 65% by weight Northern Softwood Kraft and 35% by weight *Eucalyptus* furnish.

Example 2

The NSK furnish and the *Eucalyptus* fibers are prepared by a method similar to that of Example 1, combined in the head box and deposited onto a Fourdrinier wire, running at a velocity $V_1$, homogenously to form an embryonic web.

The web is then transferred to the patterned transfer/imprinting fabric in the transfer zone without precipitating substantial densification of the web. The web is then forwarded, at a second velocity, $V_2$, on the transfer/imprinting fabric along a looped path in contacting relation with a transfer head disposed at the transfer zone, the second velocity being from about 5% to about 40% slower than the first velocity. Since the wire speed is faster than the transfer/imprinting fabric, wet shortening of the web occurs at the transfer point. Thus, the wet web foreshortening may be about 3% to about 15%.

The web is then adhered to the surface of a Yankee dryer, having a third velocity, $V_3$, by a method similar to that of Example 1. The fiber consistency is increased to an estimated 96%, and then the web is creped from the drying cylinder with a doctor blade, the doctor blade having an impact angle of from about 90 degrees to about 130 degrees. Thereafter the dried web is reeled at a fourth velocity, $V_4$, that is faster than the third velocity, $V_3$, of the drying cylinder.

Two plies of the web can be formed into paper towel products by embossing and laminating them together using PVA adhesive. The paper towel has about 53 g/m² basis weight and contains 65% by weight Northern Softwood Kraft and 35% by weight *Eucalyptus* furnish.

The properties of a pressed paper web made according to Example 1 are listed in Table 1. The corresponding properties of a creped and wet molded base paper web made with the same furnish, web transfer, and web imprinting member 219 are also listed for comparison in Table 1.

TABLE 1

Tabulated Values of Various Physical Characteristics (e.g., Design, Pattern, Crepe, Converting, Basis Weight, Dry Bulk, Wet Burst, Total Tensile Strength, Residual Water, VFS, HFS, and VFS/HFS values) for Several Substrates of the Present Invention

| PRODUCT | Des | Pat | Creped | Con | BW (gsm) | DB cc/g | WB (g) | TT (g/25.4 mm) | SST (g/sec$^{0.5}$) | $R_w$ (g) | VFS (g/g) | HFS (g/g) | VFS/HFS |
|---|---|---|---|---|---|---|---|---|---|---|---|---|---|
| Bounty #1 | | | | | 47.51 | 18.35 | 367.00 | 1979.00 | 1.46 | 0.10 | 10.00 | 23.98 | 0.42 |
| Bounty #2 | | | | | 45.83 | 13.75 | 355.00 | 1767.00 | 1.36 | 0.14 | 9.07 | 21.21 | 0.43 |
| Bounty Extra Soft #1 | | | | | 58.84 | 12.76 | 327.00 | 1519.10 | 0.77 | 0.10 | 9.01 | 20.83 | 0.43 |
| Bounty Extra Soft #2 | | | | | 63.42 | 12.08 | 262.00 | 1522.00 | 0.80 | 0.07 | 8.83 | 17.56 | 0.50 |

TABLE 1-continued

Tabulated Values of Various Physical Characteristics (e.g., Design, Pattern, Crepe, Converting, Basis Weight, Dry Bulk, Wet Burst, Total Tensile Strength, Residual Water, VFS, HFS, and VFS/HFS values) for Several Substrates of the Present Invention

| PRODUCT | Des | Pat | Creped | Con | BW (gsm) | DB cc/g | WB (g) | TT (g/25.4 mm) | SST (g/sec$^{0.5}$) | $R_w$ (g) | VFS (g/g) | HFS (g/g) | VFS/HFS |
|---|---|---|---|---|---|---|---|---|---|---|---|---|---|
| Bounty Basic #1 | | | | | 39.07 | 18.31 | 254.20 | 1273.60 | 0.17 | 0.25 | 7.88 | 17.04 | 0.46 |
| Bounty Basic #2 | | | | | 41.54 | 21.59 | 279.00 | 1474.00 | 0.45 | 0.10 | 7.58 | 16.18 | 0.47 |
| Brawny | | | | | 55.30 | 15.24 | 242.00 | 1497.00 | 1.28 | 0.09 | 8.58 | 17.43 | 0.49 |
| Scott | | | | | 40.74 | 17.03 | 242.00 | 1515.00 | 0.43 | 0.06 | 6.77 | 15.37 | 0.44 |
| Sparkle | | | | | 48.47 | 14.05 | 180.00 | 1761.00 | 0.54 | 0.22 | 5.43 | 12.66 | 0.43 |
| Viva | | | | | 63.58 | 10.84 | 314.00 | 823.00 | 0.52 | 0.04 | 9.14 | 12.92 | 0.71 |
| Costco Kirkland #1 | | | | | 40.95 | 15.87 | 271.00 | 1914.00 | 1.07 | 0.12 | 8.28 | 16.00 | 0.52 |
| Costco Kirkland #2 | | | | | 40.90 | 15.40 | 326.00 | 2518.00 | | 0.12 | 7.62 | 14.43 | 0.53 |
| Sam's Member's Mark | | | | | 41.46 | 16.24 | 314.00 | 2482.00 | 1.07 | 0.16 | 8.34 | 18.58 | 0.45 |
| Target Up & Up | | | | | 45.69 | 15.90 | 285.00 | 1924.00 | 1.26 | 0.11 | 8.26 | 15.45 | 0.53 |
| Wal-Mart Great Value | | | | | 40.87 | 17.35 | 323.00 | 2355.00 | 0.86 | 0.13 | 8.04 | 15.80 | 0.51 |
| Small Steps | | | | | 49.30 | | 230.00 | 2121.00 | | 0.15 | 4.87 | 10.73 | 0.45 |
| Scott Naturals | | | | | 38.56 | | 249.00 | 1515.00 | 0.43 | 0.20 | 6.78 | 15.41 | 0.44 |
| Kroger Everyday | | | | | 40.35 | | 90.00 | 1003.00 | | 0.16 | 6.65 | 16.07 | 0.41 |
| Kroger Nice & Strong | | | | | 46.01 | 15.45 | 295.60 | 1714.70 | 0.97 | 0.13 | 7.49 | 16.22 | 0.46 |
| T-Maid | | | | | | | | | 0.54 | | | | |
| MG | | | | | 49.23 | 14.06 | 234.83 | 2120.67 | | 0.15 | 4.87 | 10.73 | 0.45 |
| Development BJ01 | CK | F | Y | FSO | 53.95 | 18.44 | 400.20 | 2187.00 | 1.33 | 0.02 | 10.84 | 21.46 | 0.51 |
| Development BJ01 | CK | F | Y | FSO | 53.89 | 19.97 | 366.00 | 1940.00 | 1.51 | 0.04 | 10.70 | 23.38 | 0.46 |
| Development BJ03 | CK | F | N | FSO | 55.19 | 17.54 | 403.40 | 2028.00 | 1.19 | 0.02 | 10.10 | 20.38 | 0.50 |
| Development BJ03 | CK | F | N | WSO | 55.22 | 16.20 | 402.40 | 2038.00 | 1.83 | 0.09 | 9.32 | 22.06 | 0.42 |
| Development BJ04 | CK | F | N | FSO | 61.06 | 16.43 | 411.80 | 2130.00 | 1.31 | 0.01 | 9.86 | 19.82 | 0.50 |
| Development BJ04 | CK | F | N | FSO | 61.29 | 16.70 | 391.60 | 2015.00 | 1.29 | 0.02 | 9.66 | 19.40 | 0.50 |
| Development BJ04 | CK | F | N | WSO | 61.56 | 14.71 | 442.40 | 2131.00 | 2.00 | 0.08 | 8.56 | 20.24 | 0.42 |
| Development BJ05 | CK | F | Y | FSO | 62.20 | 15.93 | 354.40 | 2075.00 | 1.05 | 0.01 | 10.26 | 19.62 | 0.52 |
| Development BJ05 | CK | F | Y | WSO | 61.72 | 14.44 | 350.40 | 2012.80 | 1.77 | 0.05 | 8.76 | 20.86 | 0.42 |
| Development BJ06 | CK | F | N | WSO | 42.48 | 21.45 | 276.40 | 1352.00 | 1.86 | 0.12 | 10.00 | 25.18 | 0.40 |
| Development BJ06 | CK | F | N | WSO | 43.15 | 21.93 | 245.20 | 1194.00 | 1.82 | 0.12 | 10.24 | 25.60 | 0.40 |
| Development BX11 | CK | F | Y | FSO | 54.64 | 18.55 | 433.60 | 2397.20 | 1.15 | 0.02 | 10.56 | 21.10 | 0.50 |
| Development BX12 | CK | F | N | FSO | 54.06 | 18.65 | 401.20 | 2144.60 | 1.29 | 0.01 | 10.34 | 21.16 | 0.49 |
| Development BX12 | CK | F | N | FSO | 55.04 | 20.15 | 400.67 | | 1.49 | 0.02 | 10.60 | 22.30 | 0.48 |
| Development BJ12 | CP | F | N | FSO | 52.47 | 17.87 | 498.00 | 2636.00 | 1.56 | 0.11 | 8.64 | 20.16 | 0.43 |
| Development BJ12 | CP | F | N | FSO | 52.28 | 18.23 | 415.60 | 2373.00 | 1.60 | 0.11 | 8.74 | 20.86 | 0.42 |
| Development BJ12 | CP | F | N | WSO | 53.30 | 17.00 | 434.20 | 2676.40 | 1.67 | 0.03 | 9.46 | 20.62 | 0.46 |
| Development BJ13 | CP | F | N | FSO | 51.64 | 18.70 | 326.20 | 1978.00 | 1.58 | 0.09 | 8.56 | 19.98 | 0.43 |
| Development BJ13 | CP | F | N | WSO | 53.04 | 18.22 | 326.60 | 1971.80 | 1.74 | 0.02 | 9.74 | 20.52 | 0.47 |
| Development BJ14 | CP | F | N | FSO | 59.97 | 14.93 | 365.00 | 2339.00 | 1.46 | 0.07 | 8.08 | 18.20 | 0.44 |
| Development BJ14 | CP | F | N | WSO | 60.47 | 14.98 | 371.80 | 2408.20 | 1.59 | 0.02 | 9.18 | 18.68 | 0.49 |
| Development BR11 | CP | F | Y | FSO | 53.50 | 18.93 | 376.40 | 2136.00 | 1.50 | 0.07 | 9.62 | 22.14 | 0.43 |
| Development BR11 | CP | F | Y | WSO | 54.23 | 17.32 | 358.60 | 2183.40 | 1.79 | 0.04 | 9.86 | 21.96 | 0.45 |

TABLE 1-continued

Tabulated Values of Various Physical Characteristics (e.g., Design, Pattern, Crepe, Converting, Basis Weight, Dry Bulk, Wet Burst, Total Tensile Strength, Residual Water, VFS, HFS, and VFS/HFS values) for Several Substrates of the Present Invention

| PRODUCT | Des | Pat | Creped | Con | BW (gsm) | DB cc/g | WB (g) | TT (g/25.4 mm) | SST (g/sec$^{0.5}$) | $R_w$ (g) | VFS (g/g) | HFS (g/g) | VFS/HFS |
|---|---|---|---|---|---|---|---|---|---|---|---|---|---|
| Development BR12 | CP | F | N | FSO | 52.94 | 19.28 | 365.80 | 2171.40 | 1.98 | 0.12 | 8.90 | 22.10 | 0.40 |
| Development BR12 | CP | F | N | WSO | 52.48 | 19.05 | 363.20 | 2169.80 | 2.09 | 0.06 | 9.84 | 22.44 | 0.44 |
| Development BR13 | CP | F | N | FSO | 53.57 | 18.29 | 601.00 | 2237.00 | 1.69 | 0.09 | 9.40 | 20.94 | 0.45 |
| Development BR13 | CP | F | N | WSO | 53.23 | 17.47 | 591.00 | 2249.60 | 1.95 | 0.06 | 10.48 | 21.16 | 0.50 |
| Development BR14 | CP | F | Y | FSO | 53.57 | 17.17 | 489.40 | 1852.40 | 1.36 | 0.06 | 10.04 | 21.18 | 0.47 |
| Development BR14 | CP | F | Y | WSO | 53.96 | 15.47 | 461.60 | 1859.80 | 1.66 | 0.05 | 10.06 | 20.32 | 0.50 |
| Development BX01 | CK | C | Y | FSO | 53.51 | 18.66 | 441.40 | 2387.00 | 1.45 | 0.03 | 10.14 | 22.26 | 0.46 |
| Development BX01 | CK | C | Y | WSO | 54.06 | 16.73 | 461.20 | 2455.40 | 1.76 | 0.09 | 9.04 | 22.50 | 0.40 |
| Development BX01 | CK | C | Y | FSO | 52.83 | 17.55 | 361.40 | 2035.40 | 1.44 | 0.04 | 9.94 | 23.02 | 0.43 |
| Development BX01 | CK | C | Y | WSO | 53.50 | 18.17 | 342.60 | 2006.00 | 1.70 | 0.08 | 9.14 | 21.62 | 0.42 |
| Development BX02 | CK | C | N | FSO | 54.50 | 18.10 | 425.20 | 2285.80 | 1.47 | 0.03 | 9.30 | 21.24 | 0.44 |
| Development BX02 | CK | C | N | WSO | 54.98 | 16.83 | 406.80 | 2314.80 | 1.81 | 0.07 | 8.82 | 21.40 | 0.41 |
| Development BX02 | CK | C | N | FSO | 53.46 | 17.50 | 376.40 | 1987.65 | 1.72 | 0.04 | 9.64 | 22.06 | 0.44 |
| Development BX02 | CK | C | N | WSO | 54.35 | 16.89 | 356.60 | 1864.20 | 1.74 | 0.06 | 9.66 | 21.14 | 0.46 |
| Development BX03 | CK | C | N | FSO | 54.58 | 18.13 | 681.60 | 2622.60 | 1.21 | 0.02 | 9.12 | 19.12 | 0.48 |
| Development BX03 | CK | C | N | WSO | 54.85 | 16.81 | 670.20 | 2624.60 | 1.58 | 0.07 | 8.48 | 19.00 | 0.45 |
| Development BX03 | CK | C | N | FSO | 54.10 | 17.37 | 566.60 | 2266.80 | 1.35 | 0.03 | 9.22 | 19.44 | 0.47 |
| Development BX03 | CK | C | N | WSO | 53.86 | 16.89 | 516.20 | 2039.83 | 1.59 | 0.06 | 8.66 | 20.44 | 0.42 |
| Development BX04 | CK | C | N | FSO | 61.04 | 16.34 | 454.40 | 2453.00 | 1.36 | 0.02 | 9.24 | 19.44 | 0.48 |
| Development BX04 | CK | C | N | WSO | 61.45 | 15.35 | 448.20 | 2436.00 | 1.77 | 0.06 | 8.26 | 19.78 | 0.42 |
| Development BX04 | CK | C | N | WSO | 60.48 | 15.11 | 343.60 | 2009.60 | 1.30 | 0.06 | 9.12 | 20.16 | 0.45 |
| Development BX04 | CK | C | N | FSO | 59.85 | 15.81 | 423.40 | 2125.00 | 1.74 | 0.02 | 9.34 | 20.38 | 0.46 |
| Development BX04 H | CK | C | N | FSO | 59.85 | 15.81 | 423.40 | 2125.00 | 1.74 | 0.02 | 9.34 | 20.38 | 0.46 |
| Development BX04 L | CK | C | N | FSO | 59.85 | 15.81 | 423.40 | 2125.00 | 1.74 | 0.02 | 9.34 | 20.38 | 0.46 |
| Development BR01 | CP | C | Y | FSO | 54.51 | 17.78 | 353.20 | 2202.40 | 1.79 | 0.05 | 9.00 | 19.70 | 0.46 |
| Development BR01 | CP | C | Y | WSO | 54.33 | 17.08 | 428.40 | 2165.80 | 1.65 | 0.02 | 9.40 | 20.10 | 0.47 |
| Development BR02 | CP | C | N | FSO | 52.84 | 18.47 | 367.00 | 2237.80 | 1.92 | 0.10 | 8.76 | 20.20 | 0.43 |
| Development BR02 | CP | C | N | WSO | 52.24 | 18.97 | 402.00 | 2187.20 | 1.77 | 0.03 | 9.70 | 21.08 | 0.46 |
| Development BR03 | CP | C | N | FSO | 54.28 | 18.10 | 381.00 | 2050.80 | 2.05 | 0.09 | 8.68 | 20.24 | 0.43 |
| Development BR03 | CP | C | N | WSO | 53.89 | 18.26 | 370.80 | 2083.80 | 1.67 | 0.03 | 9.56 | 20.06 | 0.48 |
| Development BR04 | CP | C | N | FSO | 58.65 | 16.97 | 329.60 | 1962.40 | 1.86 | 0.08 | 8.50 | 18.62 | 0.46 |
| Development BR04 | CP | C | N | WSO | 59.04 | 16.73 | 356.00 | 1986.40 | 1.64 | 0.02 | 9.36 | 18.44 | 0.51 |
| Development BR05 | CP | C | N | FSO | 59.34 | 16.82 | 414.60 | 2234.47 | 1.87 | 0.08 | 8.32 | 18.26 | 0.46 |
| Development BR05 | CP | C | N | WSO | 59.39 | 17.19 | 403.00 | 2260.80 | 1.68 | 0.01 | 9.26 | 19.44 | 0.48 |
| Development BR06 | CP | C | N | FSO | 54.41 | 17.05 | 592.60 | 2191.80 | 1.68 | 0.08 | 8.94 | 18.88 | 0.47 |
| Development BR06 | CP | C | N | WSO | 54.08 | 16.99 | 608.00 | 2215.00 | 1.72 | 0.06 | 9.68 | 19.66 | 0.49 |

TABLE 1-continued

Tabulated Values of Various Physical Characteristics (e.g., Design, Pattern, Crepe, Converting, Basis Weight, Dry Bulk, Wet Burst, Total Tensile Strength, Residual Water, VFS, HFS, and VFS/HFS values) for Several Substrates of the Present Invention

| PRODUCT | Des | Pat | Creped | Con | BW (gsm) | DB cc/g | WB (g) | TT (g/25.4 mm) | SST (g/sec$^{0.5}$) | $R_w$ (g) | VFS (g/g) | HFS (g/g) | VFS/HFS |
|---|---|---|---|---|---|---|---|---|---|---|---|---|---|
| Development BR07 | CP | C | Y | FSO | 54.04 | 15.16 | 483.60 | 2111.60 | 1.31 | 0.06 | 9.40 | 19.34 | 0.49 |
| Development BR07 | CP | C | Y | WSO | 54.67 | 14.62 | 489.60 | 2141.80 | 1.60 | 0.06 | 9.44 | 19.58 | 0.48 |

CK—Continuous Knuckle (i.e., continuous network web imprinting surface 222)
CP—Continuous Pillow (i.e., continuous deflection conduit 230a)
F—Fractal Design
C—Constructal Design
FSO—Converted Fabric Side Out
WSO—Converted Wire Side Out The dimensions and values disclosed herein are not to be understood as being strictly limited to the exact dimension and values recited. Instead, unless otherwise specified, each such dimension and/or value is intended to mean both the recited dimension and/or value and a functionally equivalent range surrounding that dimension and/or value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A web product having a machine direction and a cross-machine direction orthogonal thereto, said web product having at least one ply, said at least one ply having a first plurality of pillow regions having a first total area in said machine and cross-machine directions and a second plurality of pillow regions having a second total area in said machine and cross-machine directions, said first and second total areas having a different value, and said web product having a Dry Bulk, DB, value greater than 15.5 c/g and a Wet Burst, WB, value greater than 400 g.

2. The web product of claim 1 wherein said DB value is greater than 17.5 cc/g.

3. The web product of claim 2 wherein said Wet Burst, WB, value is greater than 425 g.

4. The web product of claim 3 wherein said Wet Burst, WB, value is greater than 461.0 g.

5. The web product of claim 4 wherein said Wet Burst, WB, value is greater than 466.0 g.

6. The web product of claim 5 wherein said Wet Burst, WB, value is greater than 592.6 g.

7. The web product of claim 2 wherein said DB value is greater than 18.5 cc/g.

8. The web product of claim 7 wherein said DB value is greater than 20.0 cc/g.

9. The web product of claim 8 wherein said DB value is greater than 21.5 cc/g.

10. The web product of claim 1 wherein said web product has a residual water value, $R_w$, of less than about 0.12 g.

* * * * *